US008738788B2

(12) United States Patent
Tanimoto

(10) Patent No.: US 8,738,788 B2
(45) Date of Patent: May 27, 2014

(54) FIRST RELAY SERVER AND SECOND RELAY SERVER

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 235 days.

(21) Appl. No.: 13/255,958

(22) PCT Filed: Mar. 8, 2010

(86) PCT No.: PCT/JP2010/001594
§ 371 (c)(1),
(2), (4) Date: Oct. 3, 2011

(87) PCT Pub. No.: WO2010/103781
PCT Pub. Date: Sep. 16, 2010

(65) Prior Publication Data
US 2012/0008634 A1 Jan. 12, 2012

(30) Foreign Application Priority Data

Mar. 13, 2009 (JP) ................................. 2009-060605
Apr. 9, 2009 (JP) ................................. 2009-094546

(51) Int. Cl.
*G06F 15/16* (2006.01)
(52) U.S. Cl.
USPC ........................... 709/229; 709/227; 709/228
(58) Field of Classification Search
USPC ......................................... 709/227, 228, 229
See application file for complete search history.

(56) References Cited

U.S. PATENT DOCUMENTS 6,574,656 B1   6/2003   Nagaoka et al.
6,898,641 B1   5/2005   Kobayashi 6,950,431 B1 *  9/2005  Nozaki et al. ................. 370/390
7,647,388 B2    1/2010  Kato
8,065,418 B1   11/2011  Abuan et al.
8,107,498 B2 *  1/2012  Morimoto et al. ............ 370/501
2002/0059436 A1  5/2002  Kubo (Continued)

FOREIGN PATENT DOCUMENTS

JP      09-168055 A     6/1997
JP      09-282216 A    10/1997

(Continued)

OTHER PUBLICATIONS

Tanimoto, "Relay Server and Relay Communication System Arranged to Share Resources Between Networks." U.S. Appl. No. 13/153,497, filed Jun. 6, 2011.

(Continued)

*Primary Examiner* — Kenny Lin
(74) *Attorney, Agent, or Firm* — Keating & Bennett, LLP

(57) ABSTRACT

A communication system achieves excellent flexibility and expandability and includes communication terminals that communicate with each other through a WAN. A first relay server and a second relay server share relay group information and relay server information. In the relay group information, a network address of a first LAN that performs routing control via the first relay server and a network address of a second LAN that performs routing control via the second relay server are registered. The first and second relay servers establish a routing session via a WAN. When a communication terminal connected to the first LAN sends out a communication packet in which an IP address of a communication terminal connected to the second LAN is designated, the communication packet is routed through the routing session between the first and second relay servers while being encapsulated.

8 Claims, 22 Drawing Sheets

(56) References Cited

U.S. PATENT DOCUMENTS

| | | |
|---|---|---|
| 2002/0095506 A1 | 7/2002 | Tanimoto |
| 2002/0118398 A1 | 8/2002 | Tanimoto |
| 2002/0143956 A1 | 10/2002 | Tanimoto |
| 2003/0140637 A1 | 7/2003 | Masui et al. |
| 2003/0144872 A1 | 7/2003 | Masui et al. |
| 2004/0078426 A1 | 4/2004 | Nagami et al. |
| 2004/0172395 A1 | 9/2004 | Edelstein et al. |
| 2004/0218611 A1 | 11/2004 | Kim |
| 2007/0274329 A1 | 11/2007 | Takeyoshi et al. |
| 2008/0137672 A1 | 6/2008 | Tanimoto |
| 2008/0147825 A1 | 6/2008 | Tanimoto |
| 2008/0288591 A1 | 11/2008 | Tanimoto |
| 2008/0298367 A1 | 12/2008 | Furukawa |

FOREIGN PATENT DOCUMENTS

| | | |
|---|---|---|
| JP | 2000-059465 A | 2/2000 |
| JP | 2001-092702 A | 4/2001 |
| JP | 2001-292167 A | 10/2001 |
| JP | 2001-306382 A | 11/2001 |
| JP | 2002-149519 A | 5/2002 |
| JP | 2002-217943 A | 8/2002 |
| JP | 2002-247036 A | 8/2002 |
| JP | 2002-290441 A | 10/2002 |
| JP | 2004-139291 A | 5/2004 |
| JP | 2004-213533 A | 7/2004 |
| JP | 2004-229299 A | 8/2004 |
| JP | 2004-265415 A | 9/2004 |
| JP | 2005-086520 A | 3/2005 |
| JP | 2005-157699 A | 6/2005 |
| JP | 2005-267658 A | 9/2005 |
| JP | 2005-328239 A | 11/2005 |
| JP | 2006-202218 A | 8/2006 |
| JP | 2006-337021 A | 12/2006 |
| JP | 2007-104440 A | 4/2007 |
| JP | 2007-310508 A | 11/2007 |
| JP | 2008-028600 A | 2/2008 |
| JP | 2008-092520 A | 4/2008 |
| JP | 2008-129991 A | 6/2008 |
| JP | 2008-148046 A | 6/2008 |
| JP | 2008-148200 A | 6/2008 |
| JP | 2008-154070 A | 7/2008 |
| JP | 2010-178089 A | 8/2010 |
| JP | 2010-256989 A | 11/2010 |
| JP | 2010-267084 A | 11/2010 |
| JP | 2010-278636 A | 12/2010 |
| JP | 2011-055452 A | 3/2011 |
| JP | 2011-055453 A | 3/2011 |
| JP | 2011-055454 A | 3/2011 |
| JP | 2011-160103 A | 8/2011 |
| WO | 2006/090465 A1 | 8/2006 |

OTHER PUBLICATIONS

Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "Relay Device and Communication System", U.S. Appl. No. 13/341,711, filed Dec. 30, 2011.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S Appl. No. 13/496,664, filed Mar. 16, 2012.
Inai et al., "A Scalable Log Collecting Scheme for Host-Based Traffic Monitoring System," Information Processing Society of Japan Symposium Series, vol. 2008, No. 1, Jul. 2, 2008, 27 pages.
Tanimoto, "Relay-Server Arranged to Carry Out Communications Between Communication Terminals on Different Lans," U.S. Appl. No. 11/853,943, filed Sep. 12, 2007.
Tanimoto, "File Server Device Arranged in a Local Area Network and Being Communicable With an External Service Arranged in a Wide Area Network," U.S. Appl. No. 11/862,654, filed Sep. 27, 2007.
Tanimoto, "File Transfer Server," U.S. Appl. No. 11/870,622, filed Oct. 11, 2007.
Tanimoto, "Relay Server and Client Terminal," U.S. Appl. No. 11/953,351, filed Dec. 10, 2007.
Tanimoto, "Relay Server, Relay Communication System, and Communication Device," U.S. Appl. No. 11/944,495, filed Nov. 23, 2007.
Tanimoto, "Relay Server and Relay Communication System Arranged to Share Resources Between Networks," U.S. Appl. No. 11/953,505, filed Dec. 10, 2007.
Tanimoto, "Relay Server and Relay Communication System," U.S. Appl. No. 12/103,933, filed Apr. 16, 2008.
Tanimoto, "Relay Server and Relay Communication System," U.S. Appl. No. 12/112,127, filed Apr. 30, 2008.
Tanimoto, "Relay Server and Relay Communication System," U.S. Appl. No. 12/107,793, filed Apr. 23, 2008.
Tanimoto, "Relay Server and Relay Communication System," U.S. Appl. No. 12/270,883, filed Nov. 14, 2008.
Tanimoto, "Relay Server adn Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto, "Relay Server and Relay Communication System," U.S. Appl. No. 12/340,868, filed Dec. 22, 2008.
Tanimoto, "Relay Server and Relay Communication System," U.S. Appl. No. 13/061,234, filed Feb. 28, 2011.
Tanimoto, "Relay Server, Relay Communication System, and Communication Apparatus, " U.S. Appl. No. 13/061,725, filed Mar. 2, 2011.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Tanimoto, Relay Device and Communication System, U.S. Appl. No. 11/723,466, filed Mar. 20, 2007.
Official Communication issued in International Patent Application No. PCT/JP2010/001594, mailed on Mar. 30, 2010.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
English translation of Official Communication issued in corresponding International Application PCT/JP2010/001594, mailed on Oct. 27, 2011.
Hikari, Ethernet VPN Device, FNX0620, User Manual, 57 pages.

* cited by examiner

```
                                    ┌─ 51-1
┌───────────────────────────────────┴──────────────────────┐
│ <?xml version= "1.0" encoding= "UTF-8" ?>                │
│ -<root>                                                  │
│  -<site id= "relay-server-1@abc.net"          ⎫          │
│     name= "RELAY SERVER 1" stat= "active" >   ⎬ 511-1    │
│     <node div= "software"       ~513-1        ⎫          │
│       group= "20070402133100@relay-server-1.abc.net" ⎬ 512-1 │
│       id= "client-1@relay-server-1.abc.net"          ⎬   │
│       name= "CLIENT 1" site= "" />            ⎭          │
│   </site>                 ~514-1                         │
│ </root>                                                  │
└──────────────────────────────────────────────────────────┘

┌─ 51-2
┌───────────────────────────────────┴──────────────────────┐
│ <?xml version= "1.0" encoding= "UTF-8" ?>                │
│ -<root>                                                  │
│  -<site id= "relay-server-2@abc.net"          ⎫          │
│     name= "RELAY SERVER 2" stat= "active" >   ⎬ 511-2    │
│     <node div= "software"       ~513-2        ⎫          │
│       group= "20070402133100@relay-server-1.abc.net" ⎬ 512-2 │
│       id= "client-2@relay-server-2.abc.net"          ⎬   │
│       name= "CLIENT 2" site= "" />            ⎭          │
│   </site>                 ~514-2                         │
│ </root>                                                  │
└──────────────────────────────────────────────────────────┘
```

FIG. 4

```
                                    ┌─42
┌───────────────────────────────────┴──────────────────┐
│ <?xml version= "1.0" encoding= "UTF-8" standalone= "no" ?> │
│ -<root>                                               │
│   -<group id= "20070402133100@relay-server-1.abc.net" ⎫    │
│      lastmod= "20070402133100" name= "GROUP 1" >     ⎬ 421 │
│      <site id= "relay-server-1@abc.net" />  ⎫              │
│      <site id= "relay-server-2@abc.net" />  ⎬ 422          │
│   </group>                                            │
│ </root>                                               │
└───────────────────────────────────────────────────────┘

┌─52
┌───────────────────────────────────┴──────────────────┐
│ <?xml version= "1.0" encoding= "UTF-8" ?>             │
│ -<root>                                               │
│   -<site id= "relay-server-1@abc.net"                 │
│      name= "RELAY SERVER 1" stat= "active" > ⎬ 521-1  │
│      <node div= "software"                            │
│         group= "20070402133100@relay-server-1.abc.net"⎫│
│         id= "client-1@relay-server-1.abc.net"        ⎬522-1│
│         name= "CLIENT 1" site= "" />                 ⎭ │
│   </site>                                             │
│   -<site id= "relay-server-2@abc.net"                 │
│      name= "RELAY SERVER 2" stat= "active" > ⎬ 521-2  │
│      <node div= "software"                            │
│         group= "20070402133100@relay-server-1.abc.net"⎫│
│         id= "client-2@relay-server-2.abc.net"        ⎬522-2│
│         name= "CLIENT 2" site= "" />                 ⎭ │
│   </site>                                             │
│ </root>                                               │
└───────────────────────────────────────────────────────┘

┌─62
┌───────────────────────────────────┴──────────────────┐
│ <?xml version= "1.0" encoding= "UTF-8" ?>             │
│ -<root>                                               │
│   <node div= "software"                               │
│      group= "20070402133100@relay-server-1.abc.net"   │
│ 621⎨  node addr= "" expr= "0" ∼─622                   │
│      id= "client-1@relay-server-1.abc.net"            │
│      name= "CLIENT 1" pass= "client-1" port= "" />    │
│ </root>                                       ∼623    │
└───────────────────────────────────────────────────────┘

┌─72
┌───────────────────────────────────┴──────────────────┐
│ <?xml version= "1.0" encoding= "UTF-8" ?>             │
│ -<root>                                               │
│   <node div= "software"                               │
│      group= "20070402133100@relay-server-1.abc.net"   │
│ 721⎨  node addr= "" expr= "0" ∼ 722                   │
│      id= "client-2@relay-server-2.abc.net"            │
│      name= "CLIENT 2" pass= "client-2" port= "" />    │
│ </root>                                       ∼723    │
└───────────────────────────────────────────────────────┘
```

FIG. 5

```xml
<?xml version="1.0" encoding="UTF-8" standalone="no" ?>
-<root>
  -<group id="20070402133100@relay-server-1.abc.net"
    lastmod="20070402133100" name="GROUP 1" >
    <site id="relay-server-1@abc.net" />
    <site id="relay-server-2@abc.net" />
  </group>
</root>
```
— 42

```xml
<?xml version="1.0" encoding="UTF-8" ?>
-<root>
  -<site id="relay-server-1@abc.net"
    name="RELAY SERVER 1" stat="active" >
    <node div="software"
      group="20070402133100@relay-server-1.abc.net"
      id="client-1@relay-server-1.abc.net"
      name="CLIENT 1" site="relay-server-1@abc.net" />
  </site>
  -<site id="relay-server-2@abc.net"
    name="RELAY SERVER 2" stat="active" >
    <node div="software"
      group="20070402133100@relay-server-1.abc.net"
      id="client-2@relay-server-2.abc.net"
      name="CLIENT 2" site="" />
  </site>
</root>
```
— 53

```xml
<?xml version="1.0" encoding="UTF-8" ?>
-<root>
  <node div="software"
    group="20070402133100@relay-server-1.abc.net"
    node addr="200.1.10.1" expr="1213935960484"
    id="client-1@relay-server-1.abc.net"
    name="CLIENT 1" pass="client-1" port="5070" />
</root>
```
— 63

```xml
<?xml version="1.0" encoding="UTF-8" ?>
-<root>
  <node div="software"
    group="20070402133100@relay-server-1.abc.net"
    node addr="" expr="0"
    id="client-2@relay-server-2.abc.net"
    name="CLIENT 2" pass="client-2" port="" />
</root>
```
— 72

FIG. 6

```
                                    ┌─42
┌───────────────────────────────────────────────────────┐
│ <?xml version= "1.0" encoding= "UTF-8" standalone= "no" ?> │
│ -<root>                                               │
│  -<group id= "20070402133100@relay-server-1.abc.net"  │
│    lastmod= "20070402133100" name= "GROUP 1" >        │
│    <site id= "relay-server-1@abc.net" />              │
│    <site id= "relay-server-2@abc.net" />              │
│   </group>                                            │
│ </root>                                               │
└───────────────────────────────────────────────────────┘

┌─54
┌───────────────────────────────────────────────────────┐
│ <?xml version= "1.0" encoding= "UTF-8" ?>             │
│ -<root>                                               │
│  -<site id= "relay-server-1@abc.net"                  │
│    name= "RELAY SERVER 1" stat= "active" >            │
│    <node div= "software"      ~543-1                  │
│      group= "20070402133100@relay-server-1.abc.net"   │
│      id= "client-1@relay-server-1.abc.net"            │
│      name= "CLIENT 1" site= "relay-server-1@abc.net" />│
│   </site>                                             │
│  -<site id= "relay-server-2@abc.net"                  │
│    name= "RELAY SERVER 2" stat= "active" >            │
│    <node div= "software"      ~543-2                  │
│      group= "20070402133100@relay-server-1.abc.net"   │  542
│      id= "client-2@relay-server-2.abc.net"            │  -2
│      name= "CLIENT 2" site= "relay-server-2@abc.net" />│
│   </site>              ~544-2                         │
│ </root>                                               │
└───────────────────────────────────────────────────────┘

┌─63
┌───────────────────────────────────────────────────────┐
│ <?xml version= "1.0" encoding= "UTF-8" ?>             │
│ -<root>                                               │
│   <node div= "software"                               │
│     group= "20070402133100@relay-server-1.abc.net"    │
│ 631 ~ node addr= "200.1.10.1" expr= "1213935960484"   │
│     id= "client-1@relay-server-1.abc.net"             │
│     name= "CLIENT 1" pass= "client-1" port= "5070" /> │
│ </root>                              ~633             │
└───────────────────────────────────────────────────────┘

┌─74
┌───────────────────────────────────────────────────────┐
│ <?xml version= "1.0" encoding= "UTF-8" ?>             │
│ -<root>                                               │
│   <node div= "software"                               │
│     group= "20070402133100@relay-server-1.abc.net"    │
│ 741 ~ node addr= "210.10.20.1" expr= "1213935978484"  │
│     id= "client-2@relay-server-2.abc.net"  ~742       │
│     name= "CLIENT 2" pass= "client-2" port= "5070" /> │
│ </root>                                    ~743       │
└───────────────────────────────────────────────────────┘
```

FIG. 7

```
                                    ┌─45
                    ┌───────────────┴──────────────────────────┐
                    │ <?xml version="1.0" encoding="UTF-8" standalone="no" ?> │
                    │ -<root>                                                │
                    │   -<group id="20070402133100@relay-server-1.abc.net"  │
                    │      lastmod="20070402133100" name="GROUP 1" >         │
                    │     <site id="relay-server-1@abc.net"                  │
                    │      lan="200.1.10.0/24" />           ┐                │
                    │     <site id="relay-server-2@abc.net" ├ 452            │
                    │      lan="210.10.20.0/24" />          ┘                │
                    │   </group>                                             │
                    │ </root>                                                │
                    └────────────────────────────────────────────────────────┘

┌─54
                    ┌───────────────┴──────────────────────────┐
                    │ <?xml version="1.0" encoding="UTF-8" ?>                │
                    │ -<root>                                                │
                    │   -<site id="relay-server-1@abc.net"                   │
                    │      name="RELAY SERVER 1" stat="active" >             │
                    │     <node div="software"                               │
                    │       group="20070402133100@relay-server-1.abc.net"    │
                    │       id="client-1@relay-server-1.abc.net"             │
                    │       name="CLIENT 1" site="relay-server-1@abc.net" /> │
                    │   </site>                                              │
                    │   -<site id="relay-server-2@abc.net"                   │
                    │      name="RELAY SERVER 2" stat="active" >             │
                    │     <node div="software"                               │
                    │       group="20070402133100@relay-server-1.abc.net"    │
                    │       id="client-2@relay-server-2.abc.net"             │
                    │       name="CLIENT 2" site="relay-server-2@abc.net" /> │
                    │   </site>                                              │
                    │ </root>                                                │
                    └────────────────────────────────────────────────────────┘

┌─63
                    ┌───────────────┴──────────────────────────┐
                    │ <?xml version="1.0" encoding="UTF-8" ?>                │
                    │ -<root>                                                │
                    │   <node div="software"                                 │
                    │     group="20070402133100@relay-server-1.abc.net"      │
              631 ──┤─    node addr="200.1.10.1" expr="1213935960484"        │
                    │     id="client-1@relay-server-1.abc.net"               │
                    │     name="CLIENT 1" pass="client-1" port="5070" />     │
                    │ </root>                                      └─633     │
                    └────────────────────────────────────────────────────────┘

┌─74
                    ┌───────────────┴──────────────────────────┐
                    │ <?xml version="1.0" encoding="UTF-8" ?>                │
                    │ -<root>                                                │
                    │   <node div="software"                                 │
                    │     group="20070402133100@relay-server-1.abc.net"      │
              741 ──┤─    node addr="210.10.20.1" expr="1213935978484"       │
                    │     id="client-2@relay-server-2.abc.net"    └─742      │
                    │     name="CLIENT 2" pass="client-2" port="5070" />     │
                    │ </root>                                      └─743     │
                    └────────────────────────────────────────────────────────┘
```

FIG. 9

```
                                    ┌─56-1
┌───────────────────────────────────/──────────────────────────────┐
│ <?xml version= "1.0" encoding= "UTF-8" ?>                        │
│ -<root>                                                          │
│  -<site id= "relay-server-1@abc.net"         ⎫                   │
│    name= "RELAY SERVER 1" stat= "active"     ⎬ 561-1             │
│    lan= "200.1.10.254" >                     ⎭                   │
│    <node div= "software"                     ⎫                   │
│      group= "20070402133100@relay-server-1.abc.net"  ⎪           │
│      id= "client-1@relay-server-1.abc.net"   ⎬ 562-1             │
│      name= "CLIENT 1" site= "relay-server-1@abc.net" ⎪           │
│      lan= "200.1.10.1" />                    ⎭                   │
│  </site>                                                         │
│ </root>                                                          │
└──────────────────────────────────────────────────────────────────┘

┌─56-2
┌───────────────────────────────────/──────────────────────────────┐
│ <?xml version= "1.0" encoding= "UTF-8" ?>                        │
│ -<root>                                                          │
│  -<site id= "relay-server-2@abc.net"         ⎫                   │
│    name= "RELAY SERVER 2" stat= "active"     ⎬ 561-2             │
│    lan= "210.10.20.254" >                    ⎭                   │
│    <node div= "software"                     ⎫                   │
│      group= "20070402133100@relay-server-1.abc.net"  ⎪           │
│      id= "client-2@relay-server-2.abc.net"   ⎬ 562-2             │
│      name= "CLIENT 2" site= "relay-server-2@abc.net" ⎪           │
│      lan= "210.10.20.1" />                   ⎭                   │
│  </site>                                                         │
│ </root>                                                          │
└──────────────────────────────────────────────────────────────────┘
```

FIG. 10

```
                                                          ╱45
┌──────────────────────────────────────────────────────────┐
│ <?xml version= "1.0" encoding= "UTF-8" standalone= "no" ?>│
│ -<root>                                                   │
│  -<group id= "20070402133100@relay-server-1.abc.net"      │
│     lastmod= "20070402133100" name= "GROUP 1" >           │
│    <site id= "relay-server-1@abc.net"                     │
│     lan= "200.1.10.0/24" />                               │
│    <site id= "relay-server-2@abc.net"                     │
│     lan= "210.10.20.0/24" />                              │
│  </group>                                                 │
│ </root>                                                   │
└──────────────────────────────────────────────────────────┘

╱57
┌──────────────────────────────────────────────────────────┐
│ <?xml version= "1.0" encoding= "UTF-8" ?>                 │
│ -<root>                                          ⎫        │
│  -<site id= "relay-server-1@abc.net"             ⎬ 571-1  │
│     name= "RELAY SERVER 1" stat= "active"        ⎭        │
│     lan= "200.1.10.254" >                        ⎫        │
│    <node div= "software"                         ⎪        │
│     group= "20070402133100@relay-server-1.abc.net"⎬ 572-1 │
│     id= "client-1@relay-server-1.abc.net"        ⎪        │
│     name= "CLIENT 1" site= "relay-server-1@abc.net"⎭      │
│     lan= "200.1.10.1" />                                  │
│  </site>                                         ⎫        │
│  -<site id= "relay-server-2@abc.net"             ⎬ 571-2  │
│     name= "RELAY SERVER 2" stat= "active"        ⎭        │
│     lan= "210.10.20.254" >                       ⎫        │
│    <node div= "software"                         ⎪        │
│     group= "20070402133100@relay-server-1.abc.net"⎬ 572-2 │
│     id= "client-2@relay-server-2.abc.net"        ⎪        │
│     name= "CLIENT 2" site= "relay-server-2@abc.net"⎭      │
│     lan= "210.10.20.1" />                                 │
│  </site>                                                  │
│ </root>                                                   │
└──────────────────────────────────────────────────────────┘

╱63
┌──────────────────────────────────────────────────────────┐
│ NO CHANGE FROM FIG. 9                                     │
└──────────────────────────────────────────────────────────┘

╱74
┌──────────────────────────────────────────────────────────┐
│ NO CHANGE FROM FIG. 9                                     │
└──────────────────────────────────────────────────────────┘
```

FIG. 11

| GROUP | GROUP CONFIGURATION | ROUTING PATTERN |
|---|---|---|
| GROUP1 | RELAY SERVER 12<br>RELAY SERVER 23<br>RELAY SERVER 812 | RELAY SERVER 12 – RELAY SERVER 23 (rtid=0001) |
| | | RELAY SERVER 12 – RELAY SERVER 812 (rtid=0002) |
| GROUP2 | RELAY SERVER 12<br>RELAY SERVER 822<br>RELAY SERVER 832<br>RELAY SERVER 842 | RELAY SERVER 12 – RELAY SERVER 822 –RELAY SERVER 832 (rtid=0003) |
| | | RELAY SERVER 12 – RELAY SERVER 842 (rtid=0004) |

FIG. 19

```
<?xml version= "1.0" encoding= "UTF-8" standalone= "no" ?>
-<root>
  -<group id= "20070402133100@relay-server-1.abc.net"
    lastmod= "20070402133100" name= "GROUP 1" >
    <site id= "relay-server-1@abc.net"
    lan= "200.1.10.0/24 rtid= "0001,0002" />
    <site id= "relay-server-2@abc.net"
    lan= "210.10.20.0/24 rtid= "0001" />
    <site id= "relay-server-3@abc.net"
    lan= "220.0.100.0/24 rtid= "0002" />
  </group>
</root>
```

FIG. 20

```
<?xml version="1.0" encoding="UTF-8" standalone="no" ?>
-<root>
 -<group id= "20070402567800@relay-server-1.abc.net"
    lastmod= "20070402567800" name= "GROUP 2" >
    <site id= "relay-server-1@abc.net"
     lan= "200.1.10.0/24 rtid= "0003,0004" />
    <site id= "relay-server-4@abc.net"
     lan= "230.10.5.0/24 rtid= "0003" />
    <site id= "relay-server-5@abc.net"
     lan= "240.10.10.0/24 rtid= "0003" />
    <site id= "relay-server-6@abc.net"
     lan= "250.0.10.0/24 rtid= "0004" />
 </group>
</root>
```

FIRST RELAY SERVER AND SECOND RELAY SERVER

BACKGROUND OF THE INVENTION

1. Field of the Invention

The present invention relates to a relay server that enables client terminals connected to local area networks (LANs) to communicate with one another beyond a wide area network (WAN).

2. Description of the Related Art

By using a virtual private network (VPN), a client terminal can communicate with another client terminal remotely located across a WAN. However, it is difficult for the VPN to construct a network that has expandability and flexibility.

A relay communication system disclosed in Japanese Patent Laid-Open Publication No. 2008-129991 can construct a network that appears as if remote LANs are directly connected to one another, in a similar way to a VPN. This relay communication system has better expandability and flexibility than a general VPN in that it is possible to dynamically change the group relationship among the LANs, and so on.

In the relay communication system disclosed in Japanese Patent Laid-Open Publication No. 2008-129991, each relay server shares identification information of the client terminals connected to each LAN, thus enabling communication among the client terminals. Specifically, association information between identification information of the relay servers and identification information of the client terminals is shared by the entire network, thus making it possible for the relay servers to relay communication packets among the client terminals.

SUMMARY OF THE INVENTION

According to preferred embodiments of the present invention, a communication method and communication system provide excellent flexibility and expandability and include client terminals that communicate with one another through a WAN.

A first relay server according to a preferred embodiment of the present invention is a first relay server connected to a second relay server via a wide area network. The first relay server is connected to a first LAN. A first communication terminal is connected to the first LAN. The second relay server is connected to a second LAN.

The first relay server preferably includes: a setting unit; a relay group information sharing unit; a network address information registration unit; a routing session establishment unit; a routing processing unit; and a routing session disconnection unit.

The setting unit activates or deactivates a routing function.

The relay group information sharing unit shares, with the second relay server, relay group information including information to specify the first relay server and the second relay server constituting the relay group.

The network address information registration unit registers a network address information.

Upon receiving an instruction to route a communication packet between the first relay server and the second relay server after the routing function is activated by the setting unit, the routing session establishment unit transmits a network address information of the first LAN that routes a communication packet via the first relay server to the second relay server, receives a network address information of the second LAN that routes a communication packet via the second relay server from the second relay server, and registers the network address information of the first LAN and the network address information of the second LAN in the network address information registration unit. Furthermore, the routing session establishment unit establishes a routing session with the second relay server to route the communication packet between the first LAN and the second LAN.

Upon receiving a communication packet from the first communication terminal, the routing processing unit determines whether or not a network address information corresponding to the destination address of the communication packet has been registered in the network address information registration unit, and specifies the second relay server as a relay server capable of routing the communication packet to a network address corresponding to the destination address. Subsequently, the routing processing unit transfers the communication packet through the routing session with the second relay server.

The routing session disconnection unit receives an instruction to deactivate the routing session from the setting unit, deactivates the routing session, and deletes the network address information from the network address information registration unit.

The first relay server may further include: a relay server information sharing unit that shares relay server information to register IP addresses of the first relay server and the second relay server.

A second relay server according to another preferred embodiment of the present invention is a second relay server connected to a first relay server via a wide area network. The second relay server is connected to a second LAN. The first relay server is connected to a first LAN. A first client terminal that routes a communication packet via the first relay server is connected to the first LAN.

The second relay server includes: a setting unit; a relay group information sharing unit; a relay server information sharing unit; a communication unit; a network address information registration unit; a routing session establishment unit; a routing processing unit; and a routing session disconnection unit.

The setting unit activates or deactivates a routing function.

The relay group information sharing unit shares, with the first relay server, a relay group information including information used to specify the first relay server and the second relay server constituting the relay group.

The relay server information sharing unit shares, with the first relay server and the first client terminal, a relay server information including information used to specify the first relay server and the second relay server, and information used to specify the first client terminal.

The communication unit specifies that the first client terminal is connected to the first relay server based on the relay server information. Subsequently, the communication unit communicates with the first client terminal through the first relay server.

The network address information registration unit registers a network address information.

Upon receiving an instruction to route a communication packet between the first client terminal and the second relay server after the routing function is activated by the setting unit, the routing session establishment unit receives a network address information of the first LAN from the first client terminal through the communication unit, transmits a network address information of the second LAN to the first client terminal by using the communication unit, and registers the network address information of the first LAN and the network address information of the second LAN in the network address information registration unit. Furthermore, the routing session establishment unit establishes a routing session with the first client terminal to route the communication packet between the first LAN and the second LAN.

Upon receiving a communication packet from the communication terminal connected to the second LAN, the routing processing unit determines whether or not a network address information corresponding to the destination address has been registered in the network address registration unit, and specifies the first client terminal as a terminal capable of routing the communication packet to a network address corresponding to the destination address. Subsequently, the routing processing unit transfers the communication packet through the routing session with the first client terminal.

The routing session disconnection unit receives an instruction to deactivate the routing session from the setting unit, deactivates the routing session, and deletes the network address information from the network address information registration unit.

IP addresses of the first relay server and the second relay server and an IP address of the first client terminal connected to the first relay server may be registered in the relay server information.

A first relay server according to still another preferred embodiment of the present invention is a first relay server connected to a second relay server via a wide area network. The first relay server is connected to a first LAN. A first communication terminal is connected to the first LAN. The second relay server is connected to a second LAN.

The first relay server includes: a setting unit; a relay group information sharing unit; a network address information registration unit; a routing session establishment unit; a routing processing unit; and a routing session disconnection unit.

The setting unit activates or deactivates a routing function.

The relay group information sharing unit shares, with the second relay server, relay group information including information used to specify the first relay server and the second relay server constituting the relay group.

The network address information registration unit registers a network address information.

Upon receiving an instruction to route a communication packet between the first relay server and the second relay server after the routing function is activated by the setting unit, a routing session establishment unit transmits a network address information of the first LAN to the second relay server, receives a network address information of the second LAN from the second relay server, and registers the network address information of the first LAN and the network address information of the second LAN in the network address information registration unit along with identification information of routing patterns. Furthermore, the routing session establishment unit establishes, a routing session with the second relay server to route the communication packet between the first LAN and the second LAN in a case where the first relay server and the second relay server are involved in one common routing pattern, having same identification information.

Upon receiving a communication packet from the first communication terminal, the routing processing unit determines whether or not a network address information corresponding to the destination address of the communication packet has been registered in the network address information registration unit after the network addresses of the first and second LANs have been associated with each other by the same identification information, and specifies the second relay server as a relay server capable of routing the communication packet to a network address corresponding to the destination address. Subsequently, the routing processing unit transfers the communication packet by using the routing session with the second relay server.

The routing session disconnection unit receives an instruction to deactivate the routing session from the setting unit, deactivates the routing session, and further, deletes the network address information and the identification information from the network address information registration unit. A first relay server according to a still another preferred embodiment of the present invention is a first relay server connected to a second relay server and a third relay server via a wide area network. The first relay server is connected to a first LAN. A first communication terminal is connected to the first LAN. The second relay server is connected to a second LAN. The third relay server is connected to a third LAN.

The first relay server includes: a setting unit; a relay group information sharing unit; a network address information registration unit; a routing session establishment unit; a routing processing unit; and a routing session disconnection unit.

The setting unit activates or deactivates a routing function.

The relay group information sharing unit shares, with the second relay server and the third relay server, a relay group information including information used to specify the first relay server, the second relay server and the third relay server constituting the relay group.

The network address information registration unit registers a network address information.

Upon receiving an instruction to route a communication packet among the first relay server, the second relay server and the third relay server after the routing function is activated by the setting unit, the routing session establishment unit transmits a network address information of the first LAN that routes a communication packet via the first relay server to the second relay server and the third relay server, receives a network address information of the second LAN from the second relay server, receives a network address information of the third LAN from the third relay server, and registers the network address information of the first LAN, the network address information of the second LAN and the network address information of the third LAN in the network address information registration unit along with identification information of routing patterns. Furthermore, the routing session establishment unit establishes a routing session in an arbitrary combination among the first relay server, the second relay server and the third relay server so that the communication packet may be routed among the first LAN, the second LAN and the third LAN in a case where the first relay server, the second relay server and the third relay server are involved in one common routing pattern having the same identification information.

Upon receiving a communication packet from the first communication terminal, the routing processing unit determines whether or not a network address information corresponding to the destination address of the communication packet has been registered in the network address information registration unit after the network addresses information of the first and second LANs have been associated with each other by the same identification information, and specifies the second relay server as a relay server capable of routing the communication packet to a network address corresponding to the destination address. Subsequently, if a routing session with the second relay server has been established, the routing processing unit transfers the communication packet through the routing session with the second relay server, and if the routing session with the second relay server has not been established, the routing processing unit transfers the communication packet through a routing session with the third relay server associated by the same identification information.

The routing session disconnection unit receives an instruction from the setting unit to deactivate the routing session with the second relay server, deactivates the routing session, and deletes the network address information and the identification information from the network address information registration unit.

In a case where it is decided that it is possible to route the communication packet to the second LAN, and the routing session is established with the second relay server, when an error occurs in communication using the routing session with the second relay server, the communication packet may be transferred by using the routing session with the third relay server associated by the same identification information.

A first relay server according to still another preferred embodiment of the present invention is a first relay server connected to a second relay server and a third relay server via a wide area network. The first relay server is connected to a first LAN. A first communication terminal is connected to the first LAN. The second relay server is connected to a second LAN. The third relay server is connected to a third LAN.

The first relay server includes: a setting unit; a relay group information sharing unit; a network address information registration unit; a routing session establishment unit; a routing processing unit; and a routing session disconnection unit.

The setting unit activates or deactivates a routing function. The relay group information sharing unit shares, with the second relay server and the third relay server, a relay group information including information used to specify the first relay server, the second relay server, and the third relay server constituting the relay group.

The network address information registration unit registers a network address information. Upon receiving an instruction to route a communication packet among the first relay server, the second relay server and the third relay server after the routing function is activated by the setting unit, the routing session establishment unit transmits a network address information of the first LAN that routes a communication packet via the first relay server to the second relay server and the third relay server, receives a network address information of the second LAN from the second relay server, receives a network address information of the third LAN from the third relay server, and registers the network address information of the first LAN, the network address information of the second LAN and the network address information of the third LAN in the network address information registration unit along with identification information of routing patterns. Furthermore, the routing session establishment unit establishes a routing session in an arbitrary combination among the first relay server, the second relay server and the third relay server so that the communication packet may be routed between the LANs of the relay servers which are involved in a routing pattern having, among a plurality of the identification information indicating routing patterns, one common identification information.

Upon receiving a communication packet from the first communication terminal, the routing processing unit determines whether or not a network address information corresponding to the destination address of the communication packet has been registered in the network address information registration unit after the network addresses information of the first and second LANs have been associated with each other by the same identification information among the plurality of identification information, and specifies the second relay server as a relay server capable of routing the communication packet to a network address corresponding to the destination address. Subsequently, the routing processing unit transfers the communication packet through the routing session with the second relay server.

The routing session disconnection unit receives an instruction from the setting unit to deactivate the routing session with the second relay server, deactivates the routing session, and deletes the network address information and the identification information from the network address information registration unit.

In the relay server according to various preferred embodiments of the present invention, the network addresses information of the LANs in which a routing function is validated are shared between the relay servers. Then, the routing session is established between the relay servers in which the routing function is validated. In such a way, the communication packet transmitted from the client terminal by directly designating the IP address is routed through the WAN. Moreover, the IP addresses of the relay servers and the client terminals connected to the respective LANs are shared. In such a way, in a system of network addresses in which routing is allowed, it may be possible to refer to the address information and connection information of the client terminals.

Moreover, an arbitrary client terminal connected to the LAN may be selected, and is allowed to function as a routing device. In such a way, the routing control is flexibly performed in a versatile network configuration.

In the relay server according to still another preferred embodiment of the present invention, the LANs which perform the routing control among a plurality of relay servers included in the relay group are managed based on the identification information. In such a way, at the time of transferring the communication packet between the remotely located LANs, the identification information is referred to, so as to decide a route. Moreover, by using the identification information, a plurality of individual routing patterns may be set even within the same relay group.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a view showing relay server information created up to Step S2.

FIG. 5 is a view showing information created up to Step S4.

FIG. 6 is a view showing information created up to Step S7.

FIG. 7 is a view showing information created up to Step S11.

FIG. 9 is a view showing information created up to Step S14.

FIG. 10 is a view showing relay server information exchanged in Step S15.

FIG. 11 is a view showing information created up to Step S17.

FIG. 19 is a view showing setting contents of a routing session.

FIG. 20 is a view showing relay group information.

FIG. 21 is a view showing relay group information.

DETAILED DESCRIPTION OF THE PREFERRED EMBODIMENTS

First Preferred Embodiment

Figure 1:
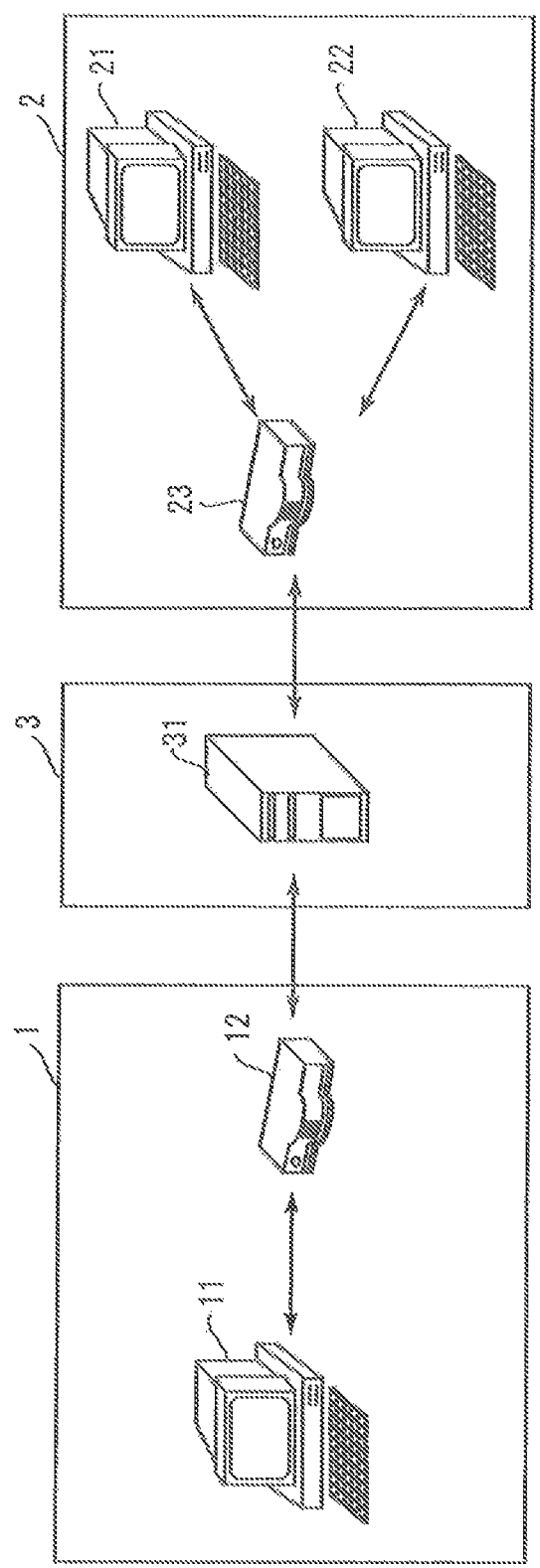
FIG. 1 is a view showing an entire configuration of a relay communication system according to a first preferred embodiment of the present invention.

A description will be made below of preferred embodiments of the present invention with reference to the drawings. FIG. 1 is a view showing an entire configuration of a relay communication system. The relay communication system includes LANs 1 and 2, a WAN 3, and the like. The WAN 3 is a wide area network such as, for example, the Internet.

A client terminal 11 and a relay server 12 are connected to the LAN 1. Client terminals 21 and 22 and a relay server 23 are connected to the LAN 2. A session initiation protocol (SIP) server 31 is connected to the WAN 3.

The client terminals 11, 21 and 22 are terminals such as personal computers, for example. The relay servers 12 and 23 relay inter-client terminal communications between the LAN 1 and the LAN 2. The SIP server 31 relays communications between the relay servers 12 and 23. In this preferred embodiment, the SIP is preferably used as a communication protocol between the relay servers 12 and 23; however, protocols other than SIP may also be used.

Figure 2:
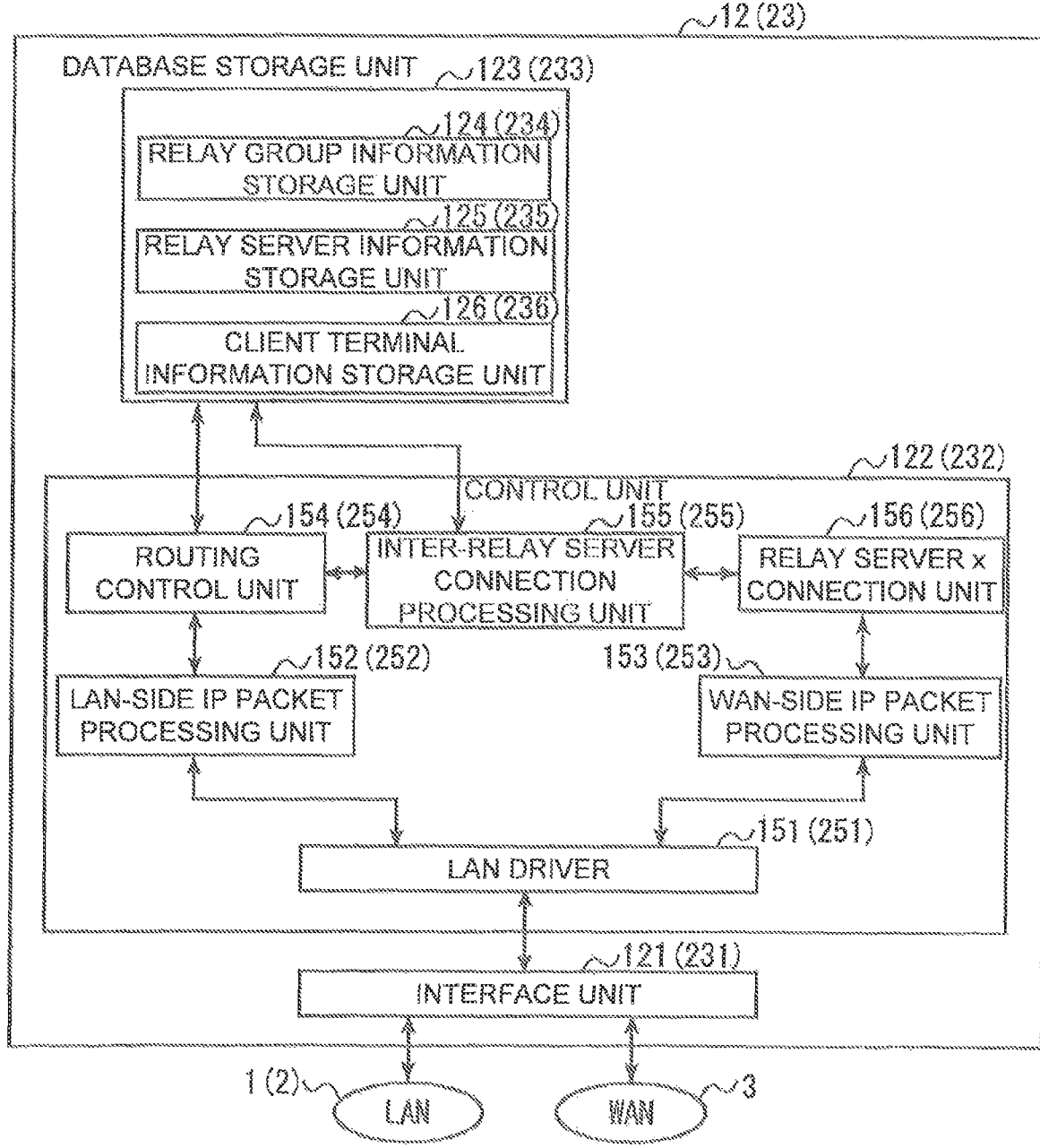
FIG. 2 is a view showing constituent elements of a relay server.

FIG. 2 is a view showing constituent elements of the relay server 12 (23). The relay server 12 (23) preferably includes an interface unit 121 (231), a control unit 122 (232), and a database storage unit 123 (233). In FIG. 2, reference numerals which are not parenthesized are reference numerals directed to the relay server 12, and reference numerals which are parenthesized are reference numerals directed to the relay server 23.

The interface unit 121 (231) performs communication with the client terminal 11 (21, 22), which is connected to the LAN 1 (2), by using a local IP address. The interface unit 121 (231) performs communication with the SIP server 31 or the like, which is connected to the WAN 3, by using a global IP address.

The control unit 122 (232) includes a LAN driver 151 (251), a LAN-side IP packet processing unit 152 (252), a WAN-side IP packet processing unit 153 (253), a routing control unit 154 (254), an inter-relay server connection processing unit 155 (255), and a relay server X connection unit 156 (256).

The LAN driver 151 (251) includes driver software that controls the interface unit 121 (231). The LAN-side IP packet processing unit 152 (252) processes a communication packet received from the LAN side, and outputs the communication packet to the routing control unit 154 (254). The routing control unit 154 (254) determines a routing destination of the communication packet based on information stored in the database storage unit 123 (233). Based on information stored in the database storage unit 123 (233), the inter-relay server connection processing unit 155 (255) determines a connection by which the communication packet is to be relayed, and outputs the communication packet to the relay server X connection unit 156 (256). A relay server X connection indicates a connection actually constructed with a specific relay server X. The relay server X connection unit 156 (256) outputs the communication packet to the WAN-side IP packet processing unit 153 (253).

Moreover, the control unit 122 (232) creates and updates a variety of databases stored in the database storage unit 123 (233). The database storage unit 123 (233) preferably includes a relay group information storage unit 124 (234), a relay server information storage unit 125 (235), and a client terminal information storage unit 126 (236).

Figure 3:
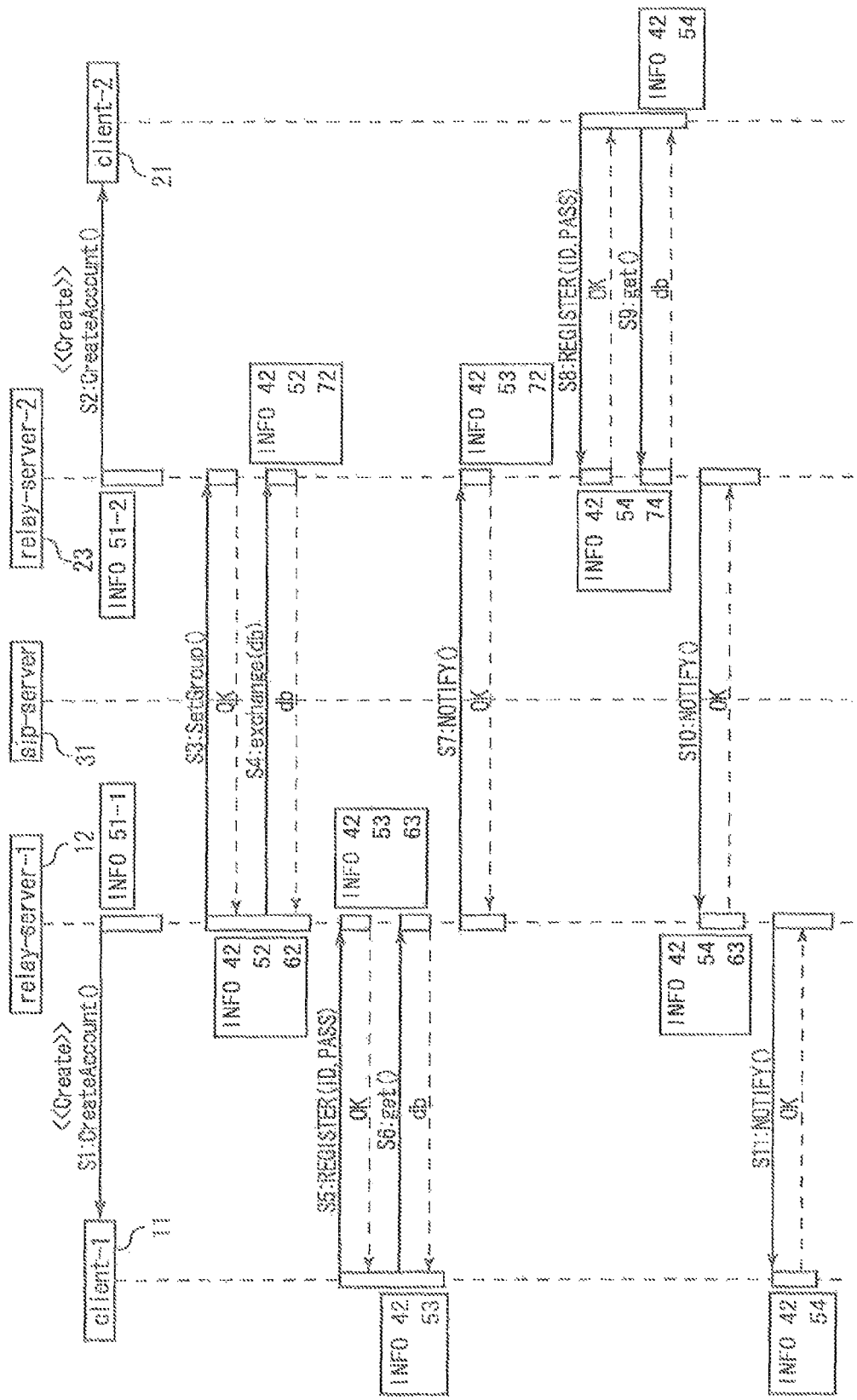
FIG. 3 is a chart showing a flow of a process regarding construction of a relay group.

FIG. 3 is a chart showing a process flow regarding the creation of a relay group information, a relay server information, and a client terminal information. Administrators of the relay servers 12 and 23 make an agreement to construct a group for a relay communication system between the LANs 1 and 2, and to validate a routing function between the LANs 1 and 2.

The administrators of the relay servers 12 and 23 create accounts for users of the client terminals 11 and 21 (Step S1, Step S2: CreateAccount( )). The control units 122 and 232 create relay server information 51-1 and 51-2, and store the relay information 51-1 and 51-2 in the relay server information storage units 125 and 235. The relay server information 51-1 and 51-2 are information indicating details of the relay servers which compose the relay communication system and, as shown in FIG. 4, are composed of upper information 511-1 and 511-2 and lower information 512-1 and 512-2.

Each of the upper information 511-1 and 511-2 is an information regarding the relay server, which is located at an upper level. "id" and "name" indicate identification information and name of the relay server. When the relay servers are activated, relay server activation information 513-1 and 513-2 are set to be "active". In such a way, information as to whether or not the relay servers are activated is shared by the entire relay communication system.

In the relay server information 51-1 shown in FIG. 4, as "id", "relay-server-1@abc.net" is set, and as "name", "RELAY SERVER 1" is set. In the relay server information 51-2, as "id", "relay-server-2@abc.net" is set, and as "name", "RELAY SERVER 2" is set. As the relay server activation information 513-1 and 513-2, "active" is set, which indicates a state where both of the relay servers 12 and 23 are activated.

Each of the lower information 512-1 and 512-2 is an information regarding the client terminal, which is located at a lower level. "div", "id" and "name" indicate the name of a division, identification information and name of the client terminal. "group" indicates identification information of a relay group to which the client terminal belongs. In client terminal site information 514-1 and 514-2, the identification information of the relay servers to which the client terminals are logged on are indicated. In such a way, information as to whether or not the client terminals are logged on to the relay servers is shared by the entire relay communication system.

In the relay server information 51-1 shown in FIG. 4, as "div", "software" is set, and as "group", "20070402133100@relay-server-1.abc.net" is set. Moreover, as "id", "client-1@relay-server-1.abc.net" is set, and as "name", "CLIENT 1" is set. The client terminal site information 514-1 is blank, and it is understood that the user of the client terminal 11 has not logged on to the relay server 12.

In the relay server information 51-2 shown in FIG. 4, as "div", "software" is set, and as "group", "20070402133100@relay-server-1.abc.net" is set. Moreover, as "id", "client-2@relay-server-2.abc.net" is set, and as "name", "CLIENT 2" is set. The client terminal site information 514-2 is blank, and it is understood that the user of the client terminal 21 has not logged on to the relay server 23.

In the following description, the communication between the relay servers 12 and 23 is relayed by the SIP server 31. The relay server 12 (23) transmits, to the SIP server 31, data in which the account of the relay server 23 (12) is designated as the communication destination, and the like. The SIP server 31 holds association between the account and the global IP address for each of the relay servers 12 and 23, and relays the communication between the relay servers using the global IP addresses.

The relay server 12 requests the relay server 23 to construct the group for the relay communication system (Step S3: Set-Group( )). The control units 122 and 232 create relay group information 42, and store the relay group information 42 in the relay group information storage units 124 and 234.

A first frame in FIG. 5 represents the relay group information 42. The relay group information 42 includes information used to specify the relay group, information used to specify the relay servers that have joined the relay group, and the like. The relay group information 42 preferably includes upper information 421 and lower information 422.

The upper information 421 is information regarding the relay group, which is located at the upper level. "id" is identification information of the relay group, and "20070402133100@relay-server-1.abc.net" is set. "lastmod" is the latest update time of the relay group information, and "20070402133100" is set. "name" is the name of the relay group, and "GROUP 1" is set.

The lower information 422 is information regarding the relay servers, which are located at the lower level. "id" is identification information of the relay servers, and "relay-server-1@abc.net" and "relay-server-2@abc.net" are set for the two relay servers.

Next, the relay server 12 requests the relay server 23 to exchange the relay server information therewith (Step S4: exchange (db)). The relay server 12 transmits the relay server information 51-1 to the relay server 23. The relay server 23 transmits the relay server information 51-2 to the relay server 12. In such a way, the relay servers 12 and 23 synthesize pieces of the relay server information 51-1 and 51-2 to create relay server information 52, and store the relay server information 52 in the relay server information storage units 125 (235).

A second frame in FIG. 5 represents the relay server information 52. Upper information 521-1 and 521-2 are similar to the upper information 511-1 and 511-2 in FIG. 4, respectively. The lower information 522-1 and 522-2 are similar to the lower information 512-1 and 512-2 in FIG. 4, respectively.

Moreover, the control unit 122 creates a client terminal information 62, and stores the client terminal information 62 in the client terminal information storage unit 126. The control unit 232 creates a client terminal information 72, and stores the client terminal information 72 in the client terminal information storage unit 236. Note that the creation process and the storing process for the client terminal information 62 and 72 are executed in Steps S1 and S2.

Third and fourth frames in FIG. 5 represent the client terminal information 62 and 72. "div" indicates the name of a division of the client terminal, and "group" indicates identification information of the relay group to which the client terminal belongs. In each of the client terminal information 62 and 72, "software" is set as "div", and "20070402133100@relay-server-1.abc.net" is set as "group".

"id", "name" and "pass" indicate identification information, name and password of the client terminal. In the client terminal information 62, "client-1@relay-server-1.abc.net" is set as "id", "CLIENT 1" is set as "name", and "client-1" is set as "pass". In the client terminal information 72, "client-2@relay-server-2.abc.net" is set as "id", "CLIENT 2" is set as "name", and "client-2" is set as "pass".

Client terminal address information 621 and 721 indicate IP addresses of the client terminals. Client terminal expiration period information 622 and 722 indicate registration expiration periods of the client terminals. Client terminal port information 623 and 723 indicate port numbers of the client terminals. In FIG. 5, the client terminal address information 621 and 721 and client terminal port information 623 and 723 are blank, which indicates a state where the users of the client terminals 11 and 21 have not logged on to the relay servers 12 and 23.

Through the above-described process flow, the relay group information 42 and the relay server information 52 are shared between the relay servers 12 and 23. Moreover, the relay server 12 owns the client terminal information 62, and the relay server 23 owns the client terminal information 72.

The user of the client terminal 11 inputs the identification information and password of the client terminal 11, and logs on to the relay server 12 (Step S5: REGISTER). The control unit 122 performs authentication for the user of the client terminal 11 by referring to the client terminal information 62.

Upon accepting the logon of the user of the client terminal 11, the control unit 122 updates the relay server information 52, and thereby creates relay server information 53. Moreover, the control unit 122 updates the client terminal information 62, thereby creates client terminal information 63.

Subsequently, the client terminal 11 requests the relay server 12 to provide it with the relay group information and the relay server information (Step S6: get( )). The relay server 12 transmits the relay group information 42 and the relay server information 53 to the client terminal 11. The client terminal 11 stores the relay group information 42 and the relay server information 53.

Upon confirming that relay server activation information 533-2 regarding the relay server 23 is "active" by referring to the relay server information 53, the control unit 122 determines that the relay server 23 should be notified that the relay server information 52 has been updated. The relay server 12 notifies the relay server 23 that the relay server information 52 has been updated to the relay server information 53 (Step S7: NOTIFY ( )). The control unit 232 updates the relay server information 52, and stores the relay server information 53 in the relay server information storage unit 235.

Through the above-described process, the relay group information 42 and the relay server information 53 are shared between the relay servers 12 and 23 and the client terminal 11. Moreover, the relay server 12 owns the client terminal information 63, and the relay server 23 owns the client terminal information 72.

A second frame in FIG. 6 represents the relay server information 53. The updated portion is underlined. The user of the client terminal 11 is logged on to the relay server 12. Therefore, "relay-server-1@abc.net" is registered in client terminal site information 534-1 of lower information 532-1.

A third frame in FIG. 6 represents the client terminal information 63. Updated portions are underlined. The user of the client terminal 11 has logged on to the relay server 12, hence an address "200.1.10.1" of the client terminal 11 is registered in client terminal address information 631. Moreover, "1213935960484" is registered in client terminal expiration period information 632, and "5070" is registered in client terminal port information 633. Note that the relay server information 42 and the client terminal information 72 are not updated.

The user of the client terminal 21 inputs the identification information and password of the client terminal 21, and logs on to the relay server 23 (Step S8: REGISTER). The control unit 232 performs authentication for the user of the client terminal 21 by referring to client terminal information 72.

Upon accepting the logon of the user of the client terminal 21, the control unit 232 updates the relay server information 53, thereby creates relay server information 54. Moreover, the control unit 232 updates the client terminal information 72, thereby creates client terminal information 74.

The client terminal 21 requests the relay server 23 to provide it with the relay group information and the relay server information (Step S9: get ( )). The relay server 23 transmits the relay group information 42 and the relay server information 54 to the client terminal 21. The client terminal 21 stores the relay group information 42 and the relay server information 54.

Upon confirming that relay server activation information 543-1 regarding the relay server 12 is "active" by referring to the relay server information 54, the control unit 232 determines that the relay server 12 should be notified that the relay server information 53 has been updated. The relay server 23 notifies the relay server 12 that the relay server information 53 has been updated to the relay server information 54 (Step S10: NOTIFY ( )). The control unit 122 updates the relay server information 53, and stores the relay server information 54 in the relay server information storage unit 125.

Moreover, the control unit 122 refers to the client terminal information 63, and notifies the client terminal 11, which has a registered client terminal address information 631, that the relay server information 53 has been updated to the relay server information 54 (Step S11: NOTIFY( )). The client terminal 11 stores the relay server information 54 by updating the relay server information 53.

Through the above-described process, the relay group information 42 and the relay server information 54 are shared between the relay servers 12 and 23 and the client terminals 11 and 21. Moreover, the relay server 12 owns the client terminal information 63, and the relay server 23 owns the client terminal information 74.

A second frame in FIG. 7 represents the relay server information 54. The updated portion is underlined. The user of the client terminal 21 has logged on to the relay server 23. Therefore, "relay-server-2@abc.net" is registered in client terminal site information 544-2 of lower information 542-2.

A fourth frame in FIG. 7 represents the client terminal information 74. Updated portions are underlined. The user of the client terminal 21 has logged on to the relay server 23, hence an address "210.10.20.1" of the client terminal 21 is registered in client terminal address information 741. Moreover, "1213935978484" is registered in client terminal expiration period information 742, and "5070" is registered in client terminal port information 743. Note that the relay group information 42 and the client terminal information 63 are not updated.

Figure 8:
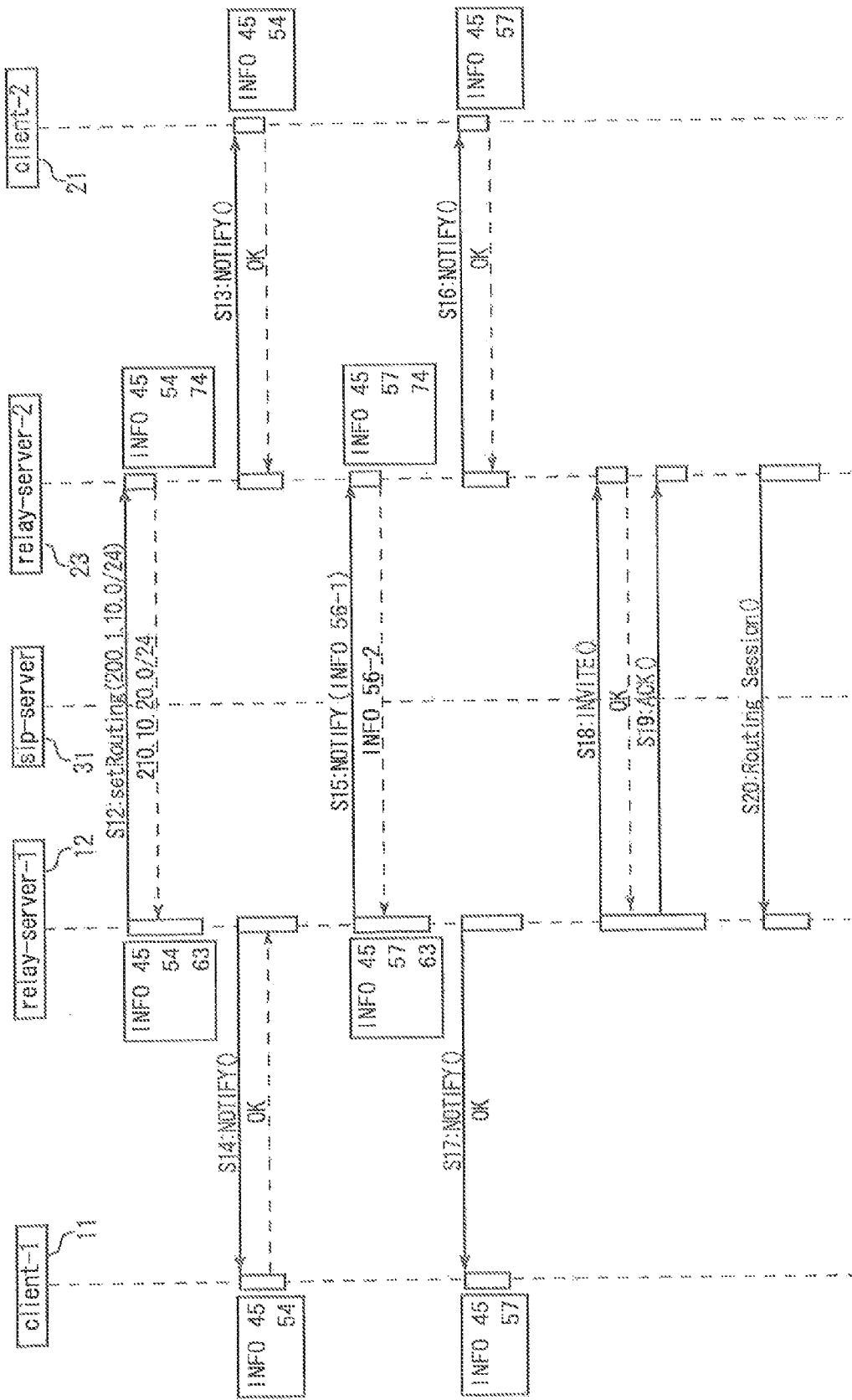
FIG. 8 is a view showing a process flow regarding construction of a routing session.

FIG. 8 is now referred to. The relay server 12 transmits a routing command to the relay server 23 (Step S12: setRouting). In a routing command transmitted from the relay server 12 to the relay server 23, an address of a network that routes an IP packet via the relay server 12 is included. Here, the relay server 12 routes an IP packet coming from the LAN 1 and, accordingly, the relay server 23 is notified of the network address (200.1.10.0/24) of the LAN 1 (the 24 at the end is a subnet mask). Upon receiving the routing command from the relay server 12, the relay server 23 issues, as a response thereto, a notice of an address of a network that routes an IP packet via the relay server 23. Here, the relay server 23 routes an IP packet coming from the LAN 2 and, accordingly, the relay server 12 is notified of the network address (210.10.20.0/24) of the LAN 2.

The control units 122 and 232 update the relay group information 42, thereby create relay group information 45, and store the relay group information 45 in the relay group information storage unit 124 (234). When the relay group information 45 is updated in the relay servers 12 and 23, the relay servers 12 and 23 specify client terminals, which should be notified of such updated information, by referring to the client terminal information 63 and 74. Then, the relay server 23 notifies the client terminal 21 of the updated information (Step S13: NOTIFY ( )). The relay server 12 notifies the client terminal 11 of the updated information (Step S14: NOTIFY ( )).

FIG. 9 shows information stored in the relay servers 12 and 23 and the client terminals 11 and 21 after Step S14. In lower information 452 of the relay group information 45, network addresses, between which IP routing has been enabled, are registered in association with the identification information of the respective relay servers. In such a way, the network addresses between which the IP routing has been enabled are shared within the relay group. Note that, in FIG. 9, the relay server information 54 and the client terminal information 63 and 74 are not updated.

Subsequently, the control unit 122 creates updated relay server information 56-1, and notifies the relay server 23 of the updated relay server information 56-1 (Step S15: NOTIFY). Upon receiving such a notice, the control unit 232 creates updated relay server information 56-2, and notifies the relay server 12 of the updated relay server information 56-2.

FIG. 10 shows the relay server information 56-1 and 56-2 exchanged in Step S15. As shown in FIG. 10, in the relay server information 56-1, an IP address (200.1.10.254) of the relay server 12 and an IP address (200.1.10.1) of the client terminal 11 are registered. In the relay server information 56-2, an IP address (210.10.20.254) of the relay server 23 and an IP address (210.10.20.1) of the client terminal 21 are registered.

The control units 122 and 232 synthesize the relay server information 56-1 and 56-2, to thereby create relay server information 57, and store the relay server information 57 in each of the relay server information storage units 125 (235). When the relay server information 57 is updated in the relay servers 12 and 23, the relay servers 12 and 23 specify client terminals, which should be notified of such updated information, by referring to the client terminal information 63 and 74. Then, the relay server 23 notifies the client terminal 21 of the updated information (Step S16: NOTIFY ( )). The relay server 12 notifies the client terminal 11 of the updated information (Step S17: NOTIFY ( )).

FIG. 11 shows information stored in the relay servers 12 and 23 and client terminals 11 and 21 after Step S17. It is understood that, in the relay server information 57, the IP addresses of the respective relay servers 12 and 23 and the IP addresses of the respective client terminals 11 and 21 are registered. As described above, the IP addresses of the relay servers and the IP addresses of the client terminals are shared within the group in which the routing function is validated. Note that the relay group information 45 and the client terminal information 63 and 74 are not updated.

Through the above-described procedure, the relay servers 12 and 23 have joined the relay group, and share the network addresses in which the routing function is validated by the relay servers 12 and 23 and the IP addresses of the relay servers 12 and 23. Moreover, the relay servers 12 and 23 also share the IP addresses of the client terminals which are logged on to the relay servers 12 and 23.

FIG. 8 is referred to one more time. Subsequently, a start request for establishing a routing session is sent from the relay server 12 to the relay server 23 (Step S18: INVITE). When a response is returned from the relay server 23 to the relay server 12, the relay server 12 transmits an ACK to the relay server 23 (Step S19). Upon receiving the ACK from the relay server 12, the relay server 23 establishes the routing session with the relay server 12 (Step S20: Routing Session). In such a way, the routing session via the WAN 3 is established between the relay servers 12 and 23.

The routing session is established between the relay servers 12 and 23, whereby the "communication terminals" connected to the LANs having the network addresses in which the routing has been established are capable of performing communication with each other, in which the IP addresses are directly designated. Here, the terms "client terminals" are not used, and the terms "communication terminals" are used on purpose. The "client terminals" are terminals connected to the relay servers, and meanwhile, the "communication terminals" indicate all terminals, which includes the "client terminals". This is because communication packets coming not only from the "client terminals" connected to the relay servers but also from all of the "communication terminals" connected to the LAN 1 or the LAN 2 may be routed by using the above-described routing session. Upon receiving the communication packets from the LAN side, the relay servers 12 and acquire transmission source IP addresses and destination IP addresses of the communication packets concerned. Then, by referring to the relay group information 45, the relay servers 12 and 23 confirm whether or not the transmission source IP addresses and the destination IP addresses are those corresponding to the LANs in which the routing function is validated. In the case where the routing function is validated, the communication packets are transferred between the relay servers, in which the routing session has been established, while being encapsulated.

For example, assume that a communication request in which the IP address of the client terminal 21 is designated as the destination is generated from the client terminal 11. By referring to the relay group information 45, the relay server 12 determines whether or not the client terminal 11 and the client terminal 21 are present in the LANs that allow routing. That is to say, the relay server 12 determines whether or not the client terminals 11 and 21 are present in the LANs that allow routing, based on the IP address of the client terminal 11 as the transmission source and the IP address of the client terminal 21 as the destination, and on the network addresses and the subnet mask, which are set in the relay group information 45. In the relay group information 45, the network addresses of the LANs 1 and 2 have been registered, and it is confirmed that the client terminals 11 and 21 are present in the LAN which allows routing. At this time, the communication packets to be transferred are encapsulated between the relay servers 12 and 23 and, accordingly, the communication can be made between the client terminals 11 and 21 without concerning the WAN 3 interposed in-between. Then, by using the local IP address, the client terminal can directly communicate through the WAN 3 with another client terminal connected to the other LAN. Note that, here, the description has been made while preferably using the client terminals 11 and 21 as an example; however, as mentioned above, the communication packets from all of the communication terminals including the client terminals may be routed in a similar method.

Figure 12:
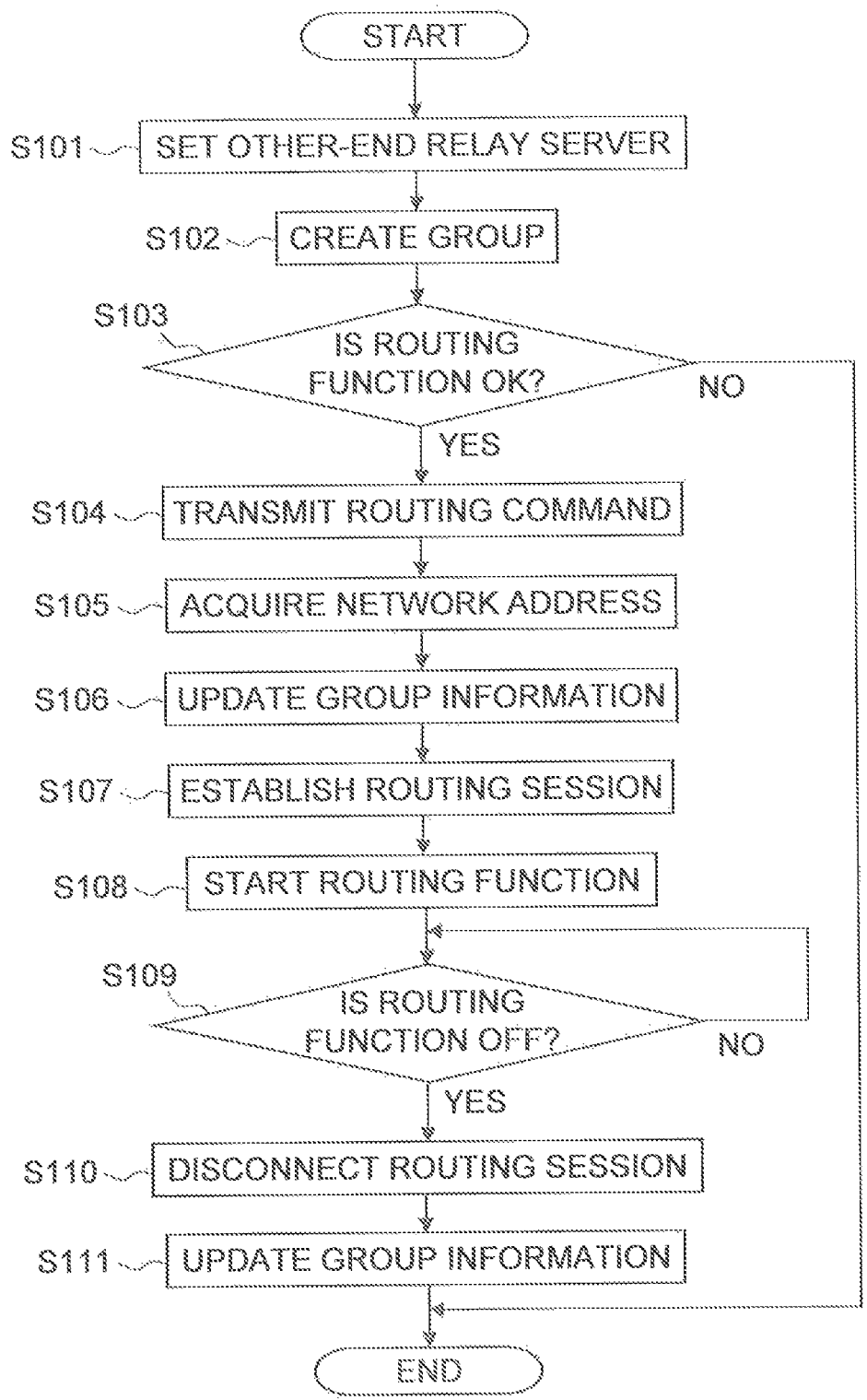
FIG. 12 is a flowchart regarding the construction of the routing session.
Figure 13:
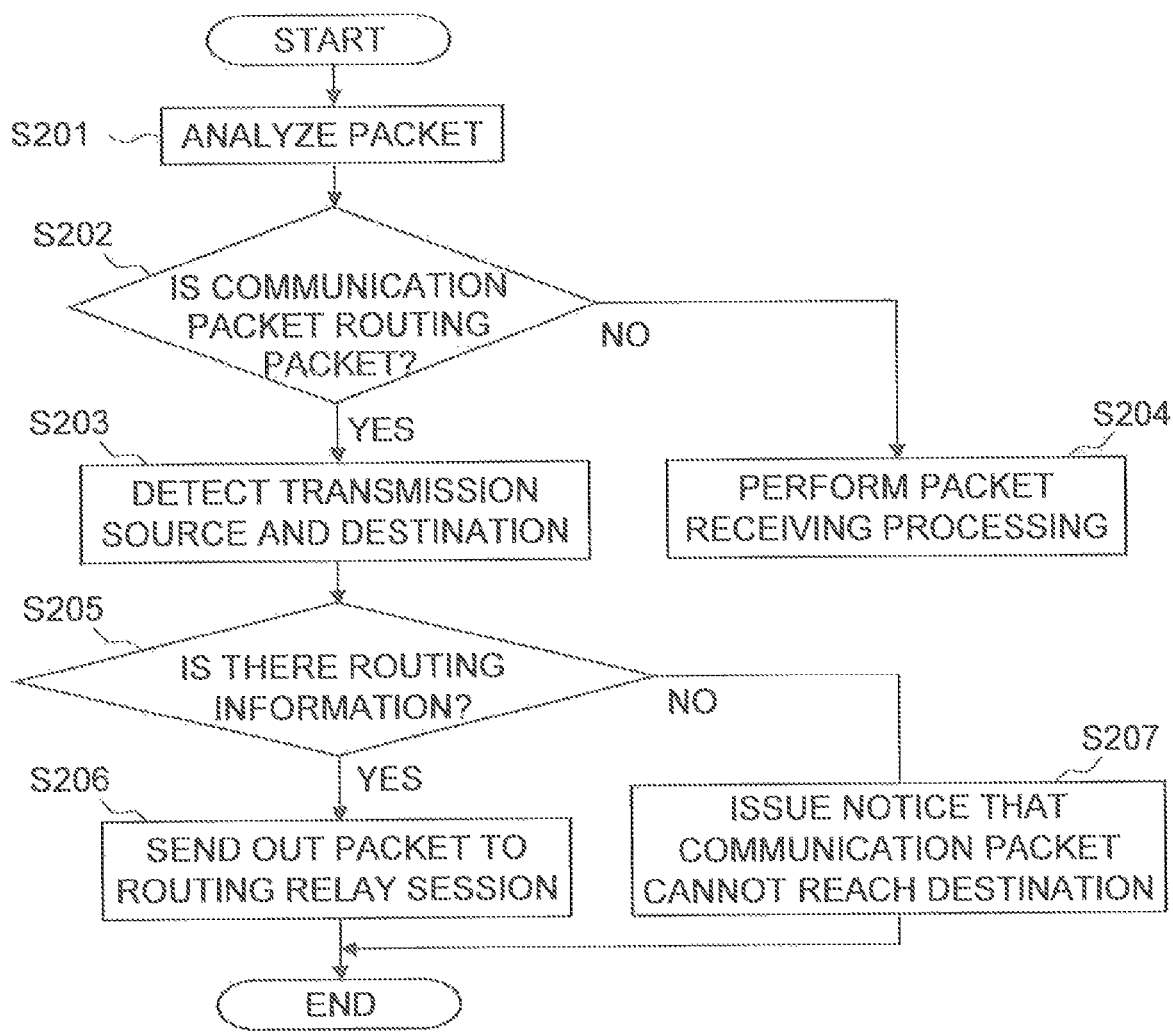
FIG. 13 is a flowchart regarding routing process.

With reference to flowcharts of FIG. 12 and FIG. 13, a description is made of a process flow up to the establishment of the routing session and a process flow for the actual routing of the communication packets. First, with reference to FIG. 12, a description is made of the process related to the establishment of the routing session.

First, an administrator of a relay server establishes the settings related to another relay server (Step S101). That is to say, the administrator establishes the settings as to with which relay server a relay group is to be composed and with which relay server the routing function is to be validated.

Next, a relay group is created between the relay servers (Step S102). This process corresponds to Steps S3 and S4 in FIG. 3. Subsequently, if the settings for validating the routing function with any relay server is present (YES in Step S103), the routing command is transmitted to the other relay server (Step S104). That is to say, as shown in Step S12 in FIG. 8, a notice of the network address of the LAN for which the relay server itself performs the routing is issued to the other-end relay server with which the routing session is to be established. As a response to this notice, the network address of the LAN for which the other-end relay server performs the routing is acquired from the other-end relay server (Step S105). This process corresponds to the response in Step S12 in FIG. 8.

Upon acquiring the network address from the other-end relay server, the relay server updates relay group information (Step S106). In the above-mentioned example, the relay group information corresponds to the relay group information 45 in FIG. 9. That is to say, the exchanged network addresses are set so as to correspond to the relay servers.

Then, the routing session is established between the relay servers (Step S107). This process corresponds to Steps S18 to S20 in FIG. 8. Through such a process, the routing is started (Step S108). As described above, the routing function according to this preferred embodiment is validated by exchanging the network address information, in which the routing is set by using the relay group information, between the relay servers which can communicate with each other. Then, by using the routing session established for routing, the routing control for the IP packets is performed based on a communication function of the relay communication system. As described above, the routing validated in this preferred embodiment is executed in the application layer, and differs from the usual IP routing. When the routing function is turned OFF by the administrator (YES in Step S109), the routing session is disconnected (Step S110), and the relay group information is updated (Step S111). That is to say, the network addresses are deleted from the state of the relay group information 45 in FIG. 9, and the state returns again to a state similar to that of the relay group information 42 in FIG. 7.

FIG. 13 is a flowchart showing the process in which the relay server routes the communication packet in the state where the routing session has been established. Upon receiving the communication packet, the relay server analyzes the communication packet (Step S201), and determines whether or not the communication packet is a routing packet (Step S202). If the communication packet is not a routing packet (NO in Step S202), a receiving process for the communication packet is performed (Step S204).

If the communication packet is a routing packet (YES in Step S202), the transmission source IP address and destination IP address of the communication packet are detected (Step S203). Then, the relay server determines whether or not it is possible to route the communication packet based on the detected transmission source IP address and destination IP address. That is to say, the relay server determines whether or not the network address information corresponding to the transmission source IP address and the destination IP address has been registered as routing information in the relay group information (Step S205).

In the case where the information indicating that routing is allowed is included in the relay group information, the communication packet is sent out through the established routing session (Step S206). In the case where the information indicating that routing is allowed is not included in the relay group information, the client terminal as the transmission source is notified that it is impossible for the communication packet to reach the destination (Step S207).

With reference to the block diagram of FIG. 2, the flow of the routing process is now described. The relay server 12 (23) receives the communication packet through the interface unit 121 (231) and the LAN driver 151 (251). If the communication packet is received from the LAN side, the communication packet is then outputted to the routing control unit 154 (254) through the LAN-side packet processing unit 152 (252). The routing control unit 154 (254) refers to the relay group information, and confirms whether or not a routing information is present. In the case where the routing information is present, the communication packet is outputted to the inter-relay server connection processing unit 155 (255).

The inter-relay server connection processing unit 155 (255) determines a connection, through which the communication packet is to be relayed, corresponding to the destination IP address of the communication packet, and delivers the communication packet to the created relay server X connection unit 156 (256). The relay server X connection unit 156 (256) is a connection actually constructed with a specific relay server.

The relay server X connection unit 156 (256) outputs the communication packet to the WAN-side IP packet processing unit 153 (253). In such a way, by using the routing session, the communication packet is transferred to the other relay server through the LAN driver 151 (251) and the interface unit 121 (231).

The relay communication system of this preferred embodiment determines the network addresses which are dynamically routed and, in addition, establishes the routing session required for the routing, thus making it possible to route the communication packet between the communication terminals through the WAN 3. The network addresses of the remotely located LANs are shared between the relay servers. Accordingly, the routing session may be dynamically established by the relay system, and the specific network addresses located remotely from each other can be connected so as to enable the IP routing only when necessary. Usually, in the VPN, a special unit is required to determine the IP addresses and connection states of the terminals present on the network. However, in the relay communication system of this preferred embodiment, it is possible to refer to the IP addresses and connection states of the relay servers and the client terminals in the relay communication system due to the sharing of the relay server information.

Figure 14:
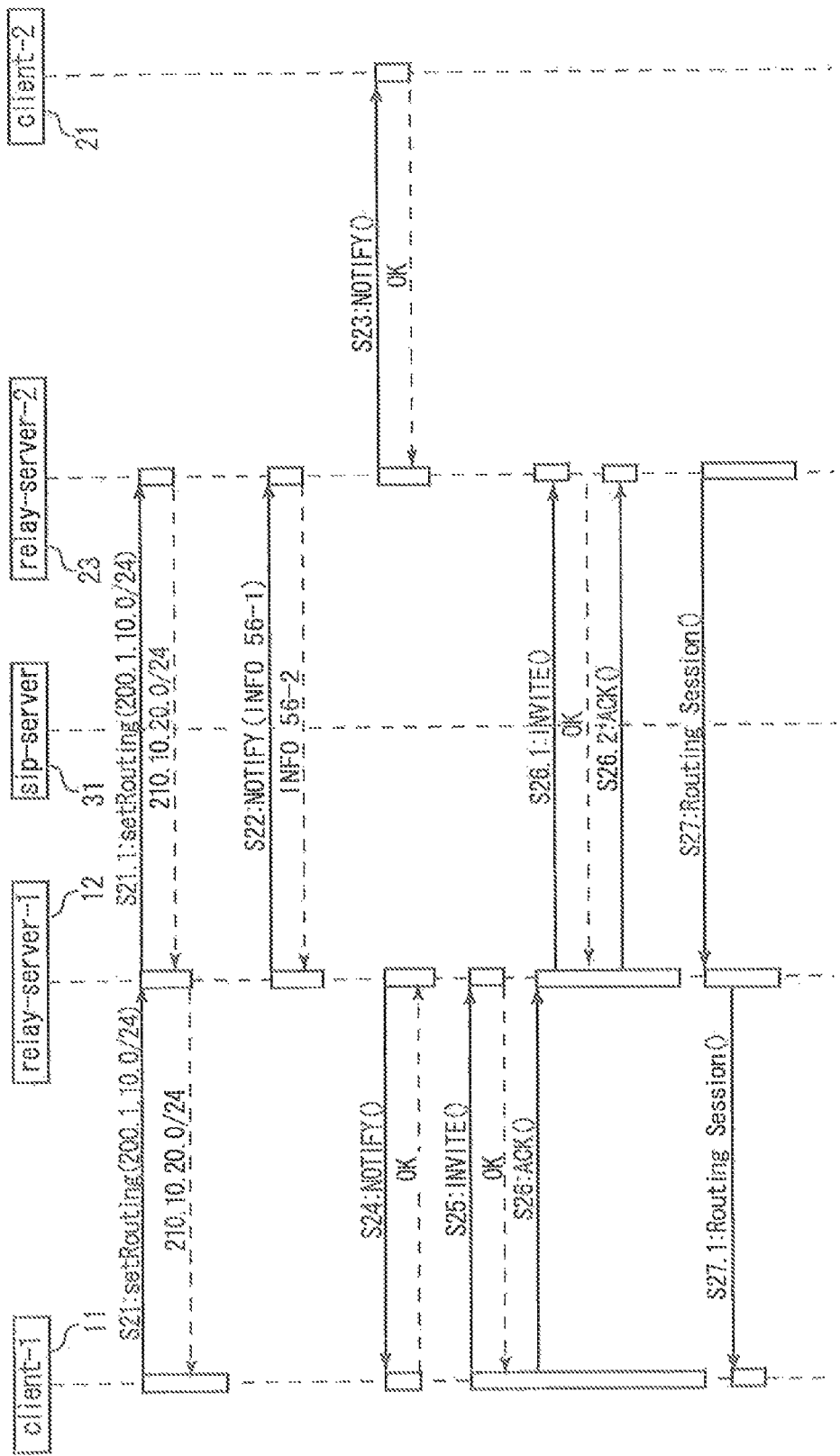
FIG. 14 is a chart showing a process for implementing a routing function in the client terminal.

As described above, the relay servers preferably function as devices which perform the routing between the LANs; however, from here, a description will be made of a preferred embodiment of implementing the routing function in the client terminals. FIG. 14 is a flowchart of implementing the routing function in the client terminal 11. Note that it is assumed that steps in FIG. 14 are executed after Step S11 in FIG. 3. That is to say, it is assumed that the steps in FIG. 8 are not executed yet.

First, the client terminal 11 transmits a routing command to the relay server 12 (Step S21: setRouting). In the routing command transmitted from the client terminal 11 to the relay server 12, an address of a network that performs the routing via the client terminal 11 is included. Here, the client terminal 11 routes the IP packet coming from the LAN 1 and, accordingly, the relay server 12 is notified of the network address (200.1.10.0/24) of the LAN 1. The relay server 12 transfers the routing command to the relay server 23 (Step S21.1).

Upon receiving the routing command from the relay server 12, the relay server 23 issues, as a response thereto, a notice of an address of a network that performs the routing via the relay server 23. Here, the relay server 23 routes an IP packet coming from the LAN 2 and, accordingly, the relay server 12 is notified of a network address (210.10.20.0/24) of the LAN 2. The relay server 12 notifies the client terminal 11 of the network address of the LAN 2.

The control units 122 and 232 update the relay group information 42, thereby create the relay group information 45 (refer to the relay group information shown in FIG. 9), and store the relay group information 45 in the relay group information storage units 124 and 234. When such an updated relay group information 45 is created in the relay servers 12 and 23, the relay servers 12 and 23 notify the client terminals 11 and 21 of the updated information of the relay group information 45.

Subsequently, the control unit 122 creates the updated relay server information 56-1 (refer to FIG. 10), and notifies the relay server 23 of the updated relay server information 56-1 (Step S22: NOTIFY). Upon receiving such a notice, the control unit 232 creates the updated relay server information 56-2 (refer to FIG. 10), and notifies the relay server 12 of the updated relay server information 56-2.

The control units 122 and 232 synthesize the relay server information 56-1 and 56-2, to thereby create the relay server information 57 (refer to FIG. 11), and store the relay server information 57 in each of the relay server information storage units 125 (235). When such an updated relay server information 57 is created in the relay servers 12 and 23, the relay servers 12 and 23 notify the client terminals 11 and 21 of the updated information of the relay server information 57 (Steps S23 and S24).

Through the above-described procedure, the client terminal 11 and the relay server 23 share the network addresses of the LANs 1 and 2, in which the routing function is validated, and the IP addresses of each other. Moreover, the client terminal 11 and the relay server 23 share the IP addresses of the client terminals connected to the LANs 1 and 2.

Subsequently, a start request to establish the routing session is sent from the client terminal 11 to the relay server 12 (Step S25: INVITE). When a response is returned from the relay server 12 to the client terminal 11, the client terminal 11 transmits an ACK to the relay server 12 (Step S26).

Subsequently, a start request to establish the routing session is sent from the relay server 12 to the relay server 23 (Step S26.1: INVITE). When a response is returned from the relay server 23 to the relay server 12, the relay server 12 transmits an ACK to the relay server 23 (Step S26.2).

Upon receiving the ACK, the relay server 23 establishes the routing session with the relay server 12 (Step S27). The relay server 12 further establishes the routing session with the client terminal 11 (Step S27.1). In such a way, the routing session via the WAN 3 is established between the client terminal 11 and the relay server 23.

As described above, in the relay communication system of this preferred embodiment, the client terminal connected to the LAN can be selected arbitrarily, and can serve as a routing device. In such a way, the routing control between the remotely located LANs can be constructed flexibly.

Figure 15:
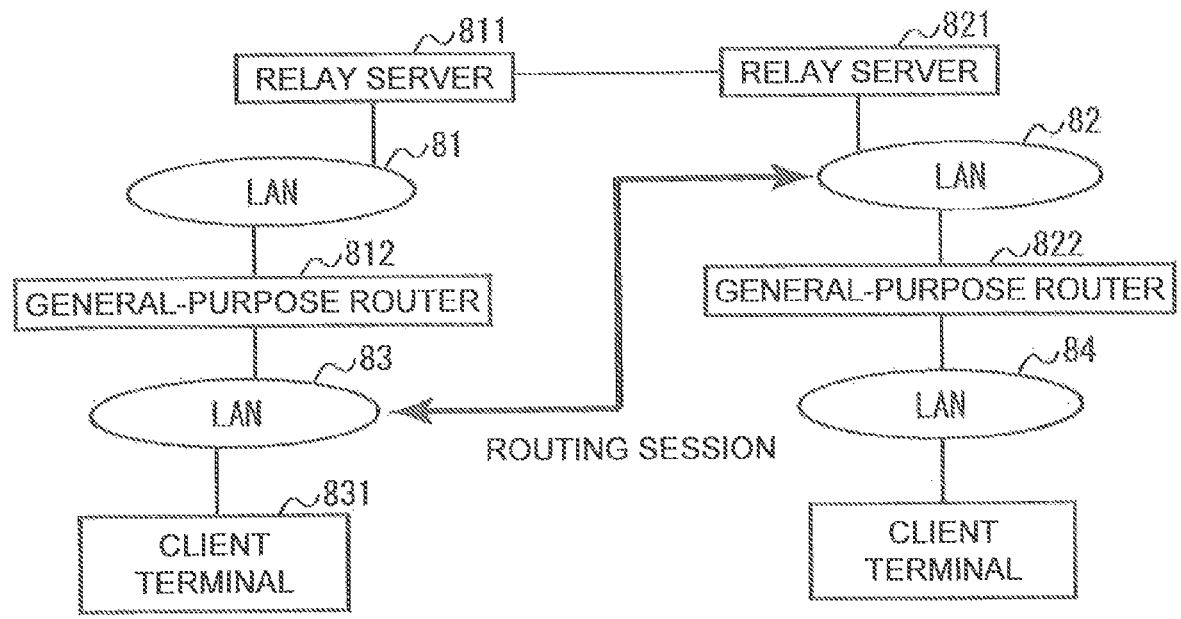
FIG. 15 is a view showing a state where the routing function is implemented in the client terminals.

For example, a network configuration as shown in FIG. 15 is considered. Four LANs 81, 82, 83 and 84 are present, and the LAN 81 and the LAN 82 are connected to each other through relay servers 811 and 821. The relay servers 811 and 821 include similar functions to those of the relay servers 12 and 23 of the present preferred embodiment. Moreover, the LAN 81 and the LAN 83 are connected to each other through a general-purpose router 812, and the LAN 82 and the LAN 84 are connected to each other through a general-purpose router 822. The general-purpose routers 812 and 822 are routers having a general packet routing function. Moreover, a client terminal 831 is connected to the LAN 83.

In the network configuration as described above, the routing function is implemented in the client terminal 831. That is to say, a similar operation to that of the client terminal 11, which has been described in the process flow of FIG. 14, is performed, and the routing session is established between the client terminal 831 and the relay server 821. In such a way, it is possible to construct the routing session even with another LAN connected through the general-purpose router, and a highly flexible network system can be configured.

Figure 16:
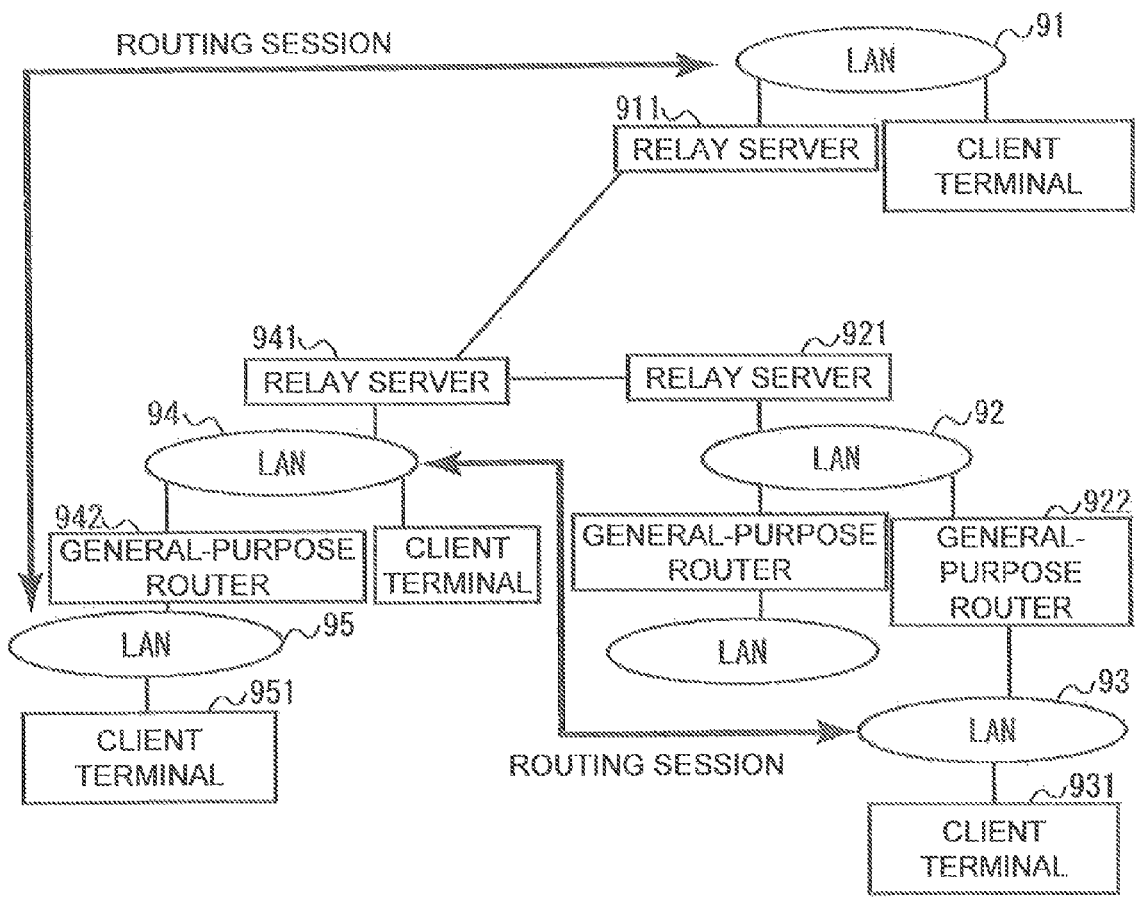
FIG. 16 is a view showing a state where the routing function is implemented in the client terminals.

Furthermore, FIG. 16 shows another example. A LAN 91 and a LAN 94 are connected to each other through a relay server 911 and a relay server 941, and a LAN 94 and a LAN 92 are connected to each other through a relay server 941 and a relay server 921. The relay servers 911, 921 and 941 have similar functions to those of the relay servers 12 and 23 of this preferred embodiment. Moreover, the LAN 94 and a LAN 95 are connected to each other through a general-purpose router 942, and the LAN 92 and a LAN 93 are connected to each other through a general-purpose router 922. Furthermore, client terminals 931 and 951 are connected to the LANs 93 and 95, respectively.

In the network configuration as described above, the routing function is implemented in the client terminal 951, and the routing session is established between the client terminal 951 and the relay server 911. Moreover, the routing function is implemented in the client terminal 931, and the routing session is established between the client terminal 931 and the relay server 941. In such a way, in the versatile network configuration, arbitrary LANs may be selected, and the routing function may be implemented in the client terminals connected to each of the LANs, hence the routing session can be freely constructed between arbitrary LANs.

Second Preferred Embodiment

Figure 17:
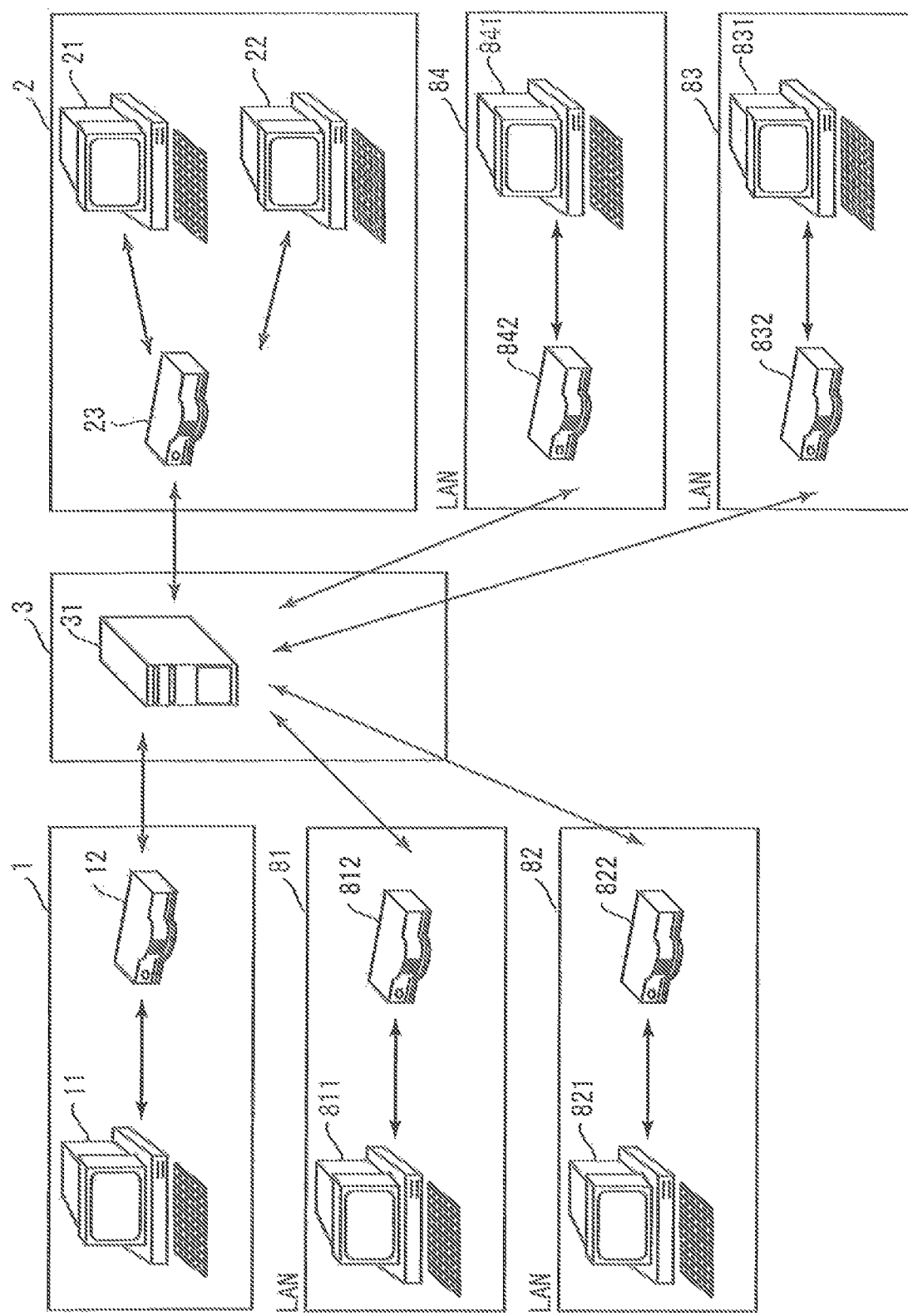
FIG. 17 is a view showing an entire configuration of a relay communication system according to a second preferred embodiment of the present invention.

Next, a description is made of a second preferred embodiment of the present invention. FIG. 17 is a view showing an entire configuration of a relay communication system according to the second preferred embodiment. In this preferred embodiment, the LANs 81, 82, 83 and 84 are additionally connected through the WAN 3.

The client terminals 811, 821, 831 and 841 and the relay servers 812, 822, 832 and 842 are connected to the LANs 81, 82, 83 and 84, respectively. The relay servers 812, 822, 832 and 842 include similar functions to those of the relay servers 12 and 23 described in the first preferred embodiment. Hence, in the second preferred embodiment, six LANs 1, 2, 81, 82, 83 and 84 are preferably included in the relay communication system, and the routing control is performed among six LANs.

Figure 18:
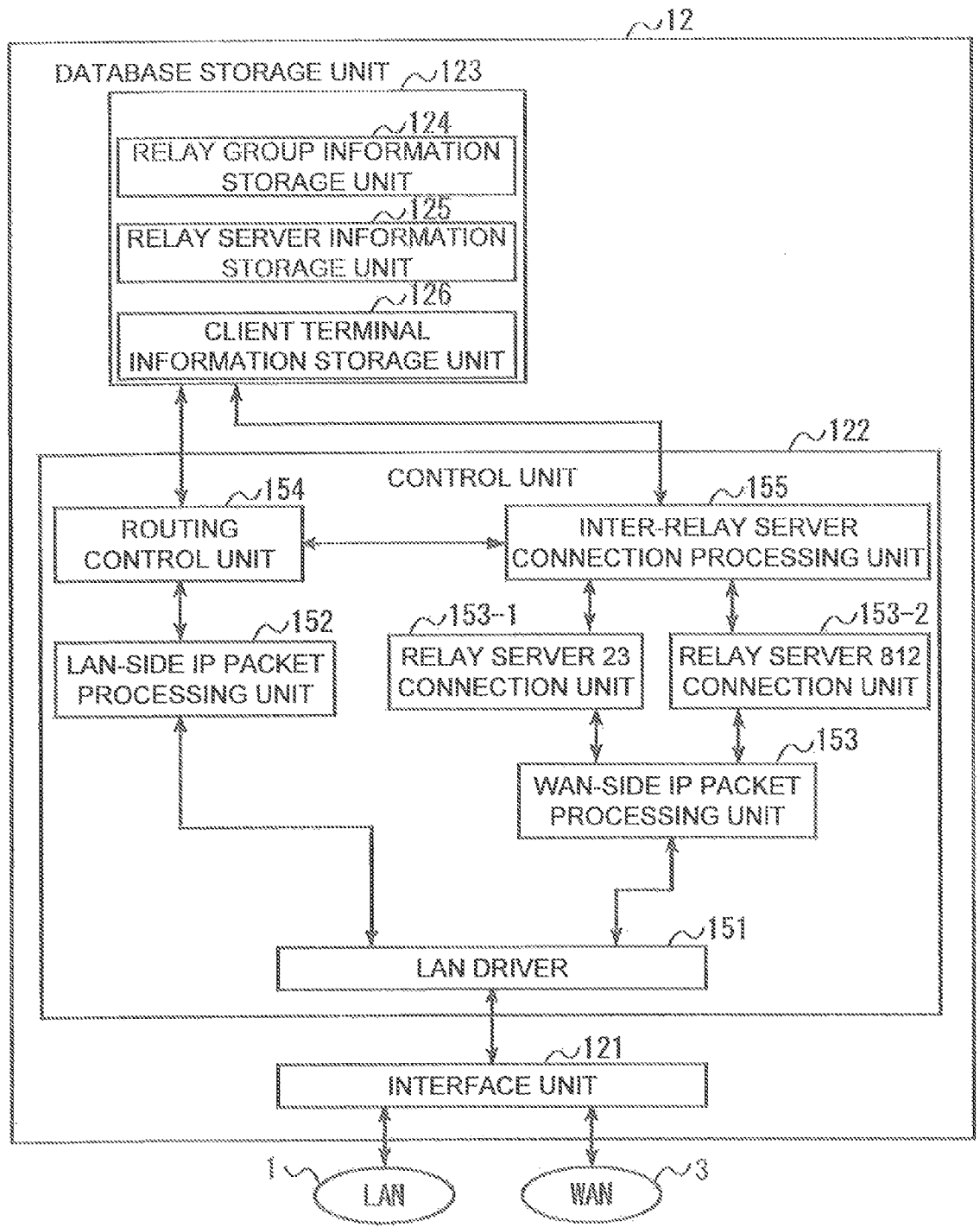
FIG. 18 is a view showing constituent elements of a relay server.

FIG. 18 is a view showing constituent elements of the relay server 12. The second preferred embodiment is different from the first preferred embodiment in that a relay server 23 connection unit 153-1 and a relay server 812 connection unit 153-2 are preferably created and included. That is to say, in the first preferred embodiment, the LANs 1 and 2 establish the routing session in a one-to-one relationship, and meanwhile, in the present preferred embodiment, six LANs establish routing sessions in arbitrary combinations. Then, FIG. 18 shows a state where the relay server 12 has established the routing sessions with the relay server 23 and the relay server 812, such that two connection units 153-1 and 153-2 have been created.

FIG. 19 is a view showing relationships between the relay groups which the relay server 12 has joined, and routing patterns. The relay server 12 joins two relay groups, namely GROUP 1 and GROUP 2. GROUP 1 is a relay group formed among three relay servers 12, 23 and 812, and GROUP 2 is a relay group formed among four relay servers 12, 822, 832 and 842.

In GROUP 1, a routing pattern between the relay servers 12 and 23 and a routing pattern between the relay servers 12 and 812 have been set. In GROUP 2, a routing pattern among the relay servers 12, 822 and 832 and a routing pattern between the relay servers 12 and 842 have been set.

As described above, in each of GROUP 1 and GROUP 2, two routing patterns independent of each other preferably have been set. For example, in GROUP 1, the routing is not performed between the relay servers 23 and 812. Moreover, in GROUP 2, the routing is not performed between the relay servers 822 and 842. In this way, a plurality of independent routing patterns can be individually formed even within one relay group and, accordingly, a relay communication system with higher flexibility can be constructed.

FIG. 20 and FIG. 21 show relay group information regarding two relay groups which the relay server 12 has joined. FIG. 20 is relay group information 46 regarding GROUP 1, and FIG. 21 is relay group information 47 regarding GROUP 2. In FIG. 20 and FIG. 21, information which is newly added in comparison with the first preferred embodiment are underlined.

In the relay group information 46 shown in FIG. 20, in upper information 461, "20070402133100@relay-server-1.abc.net" is set as the identification information "id", and "GROUP 1" is set as the group name "name".

In lower information 462, information of the relay server 812 is added in addition to those of the relay servers 12 and 23. As the information of the relay server 812, "relay-server-3@abc.net" is set in "id", and "220.0.100.0/24" is set as the network address.

Moreover, subsequent to the network address, a routing ID 463 is set. In the example of FIG. 20, "0001" is set as the routing ID 463 for the relay servers 12 and 23, and "0002" is set as the routing ID 463 for the relay servers 12 and 812. As shown in FIG. 19, the routing ID "0001" indicates the routing pattern between the relay servers 12 and 23 in GROUP 1. The routing ID "0002" indicates the routing pattern between the relay servers 12 and 812 in GROUP 1.

In the relay group information 47 shown in FIG. 21, in upper information 471, "20070402567800@relay-server-1.abc.net" is set as the identification information "id", and "GROUP 2" is set as the group name "name".

In lower information 472, information of the relay servers 822, 832 and 842 are added in addition to those of the relay server 12. As the information of the relay server 822, "relay-server-4@abc.net" is set in "id", and "230.10.5.0/24" is set as the network address. As the information of the relay server 832, "relay-server-5@abc.net" is set in "id", and "240.10.10.0/24" is set as the network address. As the information of the relay server 842, "relay-server-6@abc.net" is set in "id", and "250.0.10.0/24" is set as the network address.

Then, for the relay servers 12, 822 and 832, "0003" is set as a routing ID 473, and for the relay servers 12 and 842, "0004" is set as the routing ID 473. As also shown in FIG. 19, the routing ID "0003" indicates the routing session among the relay servers 12, 822 and 832 in GROUP 2. The routing ID "0004" indicates the routing session between the relay servers 12 and 842 in GROUP 2.

For example, the routing session among the relay servers 12, 822 and 832 with the routing ID "0003" shows that the communication packet is routed among the relay servers 12, 822 and 832, but does not include information as to between which relay servers the routing session has been established. For example, the setting of the routing ID "0003" may be satisfied based on an established routing session between the relay servers 12 and 822 and an established routing session between the relay servers 12 and 832. Alternatively, a routing session may be further established between the relay servers 822 and 832.

Figure 22:
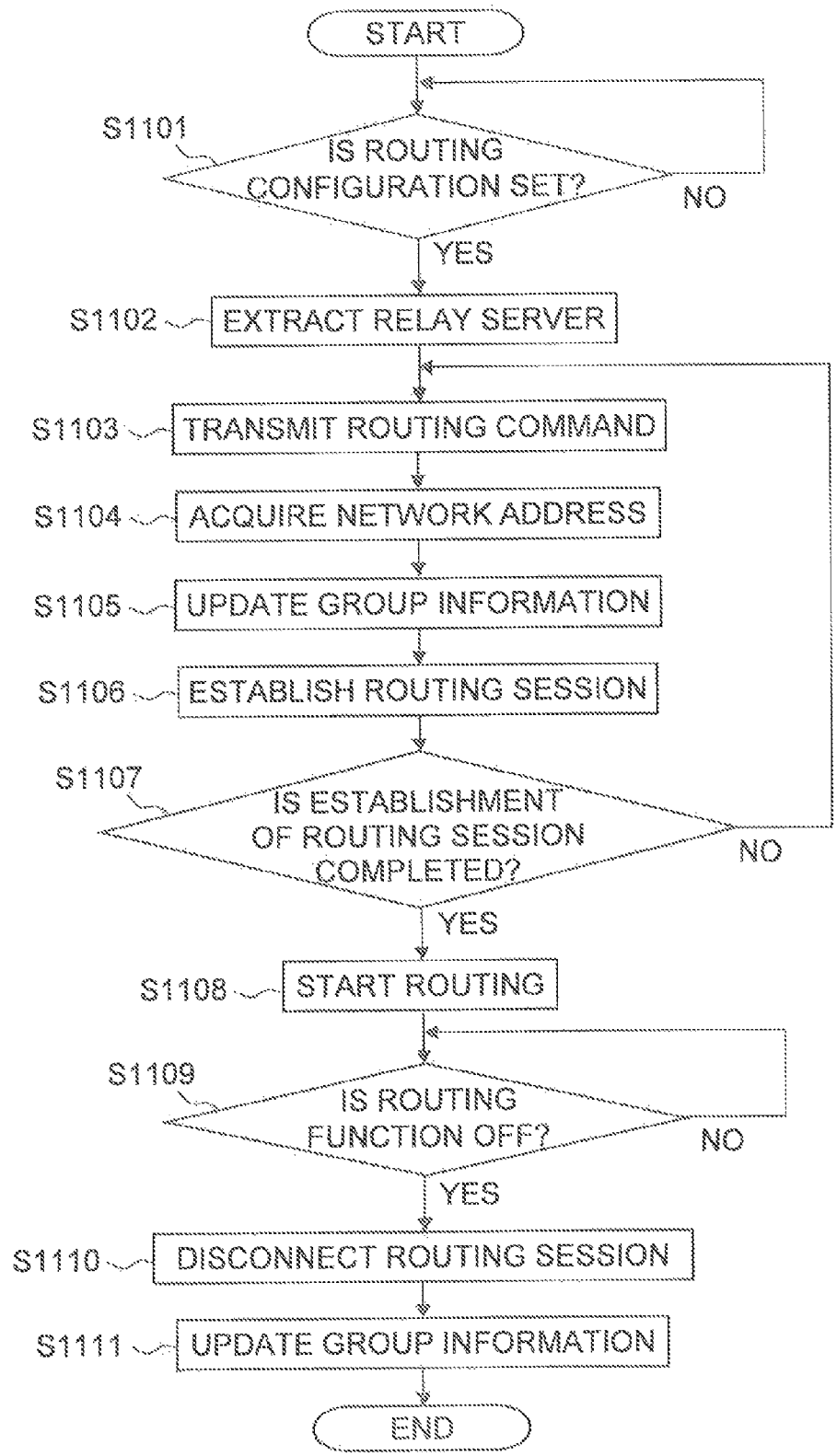
FIG. 22 is a flowchart regarding construction of the routing session.
Figure 23:
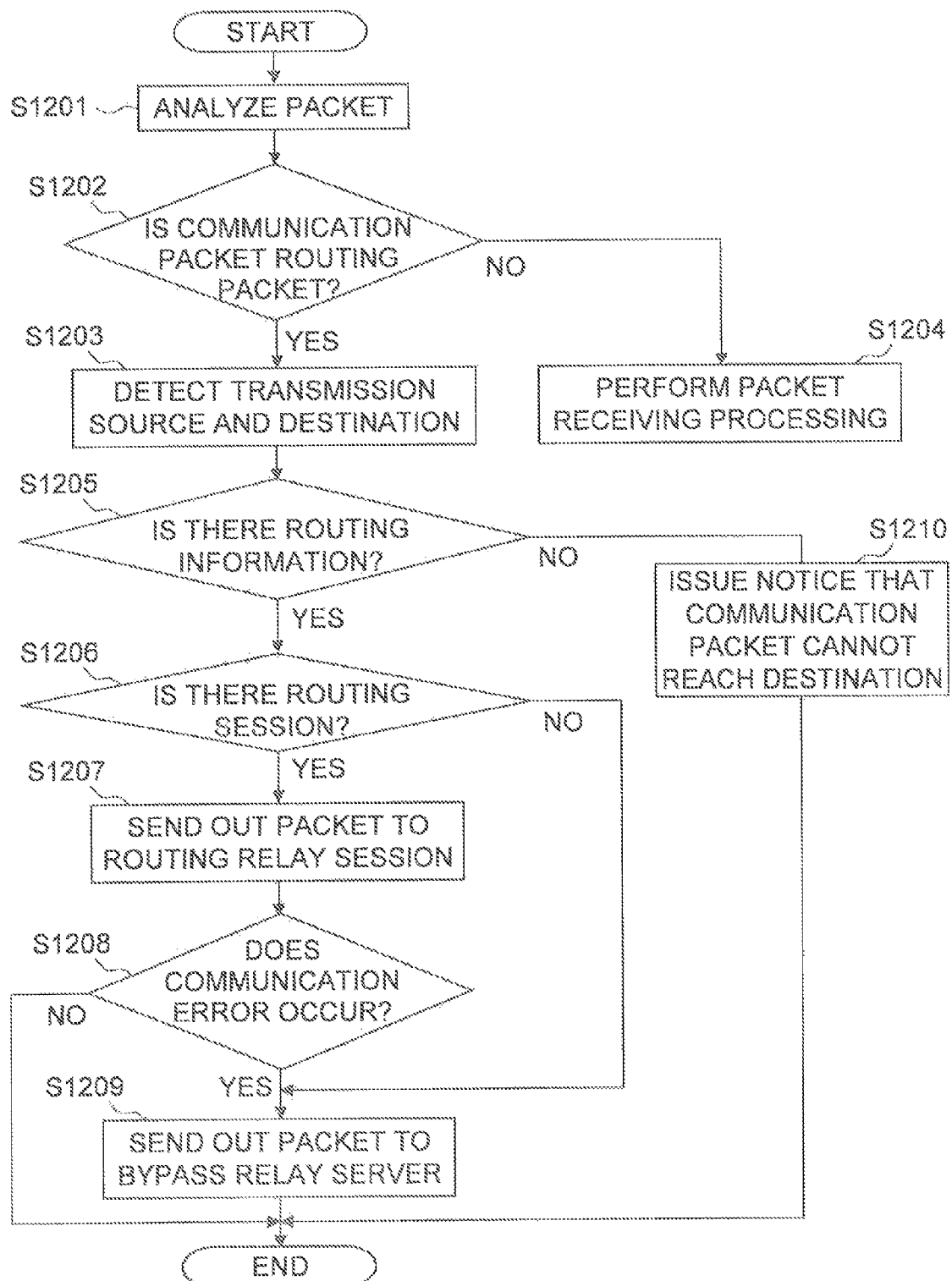
FIG. 23 is a flowchart regarding routing process.

With reference to flowcharts of FIG. 22 and FIG. 23, a description is now made of a process flow up to the establishment of the routing session and a process flow for the actual routing of the communication packets. First, with reference to FIG. 22, a description is made of the process related to the establishment of the routing session.

First, an administrator of a relay server establishes the settings for a routing configuration (Step S1101). That is to say, the administrator establishes the settings as to with which relay server a relay group is to be constituted, with which relay server a routing group is to be formed, and with which relay server the routing function is to be validated. For example, in the example shown in FIG. 19, the administrator of the relay server 12 establishes the settings to form a relay group among the relay servers 12, 23 and 812 as GROUP 1, and to form a relay group among the relay servers 12, 822, 832 and 842 as GROUP 2. Moreover, in Group 1, the administrator of the relay server 12 establishes the settings to form the routing patterns between the relay servers 12 and 23 and between the relay servers 12 and 812. Moreover, in Group 2, the administrator of the relay server 12 establishes the settings to form the routing patterns among the relay servers 12, 822 and 832 and between the relay servers 12 and 842. Furthermore, the administrator establishes the settings as to between which relay servers the routing session is to be constructed in each of the routing patterns.

Next, the relay servers, in which the routing session is set to be constructed, are extracted (Step S1102). Then, a routing command is transmitted to the extracted relay servers (Step S1103). That is to say, as shown in Step S12 of FIG. 8, a notice of the network address of the LAN for which the relay server itself performs the routing is issued to the other relay server with which the routing session is to be established. As a response to this notice, the network address of the LAN for which the other relay server performs the routing is acquired from the other relay server (Step S1104). This process corresponds to the response in Step S12 of FIG. 8.

Upon acquiring, from the other relay server, the network address for which the routing is performed, the relay server updates the relay group information (Step S1105). That is to say, as described with reference to the relay group information 45 of FIG. 9, the network addresses in which the routing function is validated are added to the relay group information. Moreover, routing IDs are individually set for the network addresses in which the routing function is validated. Then, the routing session is established between the relay servers (Step S1106). This process corresponds to Steps S18 to S20 in FIG. 8. As described above, the routing function according to this preferred embodiment is validated by exchanging the network address information, in which the routing is set by using the relay group information, between the relay servers which can communicate with each other. Then, by using the routing session established for routing, the routing control for the IP packets is performed based on a communication function of the relay communication system. As described above, the routing validated in this preferred embodiment is one that is executed in the application layer, and differs from the usual IP routing.

Next, it is determined whether or not the establishment of the routing sessions with all of the relay servers extracted in Step S1102 has been completed (Step S1107). In the case where the establishment has been completed, the routing is started (Step S1108). When the routing function is turned OFF by the administrator (YES in Step S1109), the routing session is disconnected (Step S1110), and the relay group information is updated (Step S1111). That is to say, the network address information set in the relay group information is deleted.

FIG. 23 is a flowchart showing the process in which the relay server routes the communication packet in the state where the routing session has been established. Upon receiving the communication packet, the relay server analyzes the communication packet (Step S1201), and determines whether or not the communication packet is a routing packet (Step S1202). If the communication packet is not a routing packet (NO in Step S1202), a receiving process for the communication packet is performed (Step S1204).

If the communication packet is a routing packet (YES in Step S1202), the transmission source IP address and destination IP address of the communication packet are detected (Step S1203). Then, the relay server determines whether or not it is possible to route the communication packet based on the detected transmission source IP address and destination IP address. That is to say, the relay server determines whether or not the network address information corresponding to the transmission source IP address and the destination IP address has been set as routing information having the same routing ID in the relay group information (Step S1205).

In the case where the information indicating that routing is allowed/possible is included in the relay group information (YES in Step S1205), it is determined whether or not the routing session is directly established with the destination LAN (Step S1206). If the routing session is directly established with the destination LAN (YES in Step S1206), the communication packet is sent out through the established routing session (Step S1207).

A description is now made of an example with reference to the table in FIG. 19. For example, assuming that the relay server 12 receives, from the client terminal 11, a communication packet destined for the client terminal 21. The network addresses of the LANs 1 and 2 to which the client terminals 11 and 21 are connected are associated with each other by the same routing ID, and also are set in the relay group information 46 (GROUP 1). Accordingly, in Step S1205, the relay server 12 determines that the routing information is present. The routing ID "0001" indicates the one-to-one routing setting between the relay servers 12 and 23 and, accordingly, the routing session has been established between the relay servers 12 and 23. Specifically, the inter-relay server connection processing unit 155 detects the relay server 23 connection unit 153-1, which corresponds to the relay server 23. Also, in Step S1206, it is determined that the routing session with the relay server 23 is present and, in Step S1207, the routing control is directly performed for the LAN 2.

On the other hand, if the routing session is not directly established with the destination LAN (NO in Step S1206), the communication packet is sent out through a routing session with a bypass relay server (Step S1209).

A description is now made of an example with reference to the table in FIG. 19. For example, assuming that the relay server 12 receives, from the client terminal 11, a communication packet destined for the client terminal 831. The network addresses of the LANs 1 and 83 to which the client terminals 11 and 831 are connected are associated with each other by the same routing ID, and also are set in the relay group information 47 (GROUP 2). Accordingly, in Step S1205, the relay server 12 determines that the routing information is present.

However, the routing ID "0003" indicates the routing setting among the relay servers 12, 822 and 832, and the routing session between the relay servers 12 and 832 is sometimes established, and sometimes not. In the case where the routing session is established between the relay servers 12 and 832, it is determined in Step S1206 that the routing session is present, and the routing control is directly performed for the LAN 83 in Step S1207. Specifically, the inter-relay server connection processing unit 155 detects whether or not the relay server 832 connection unit, which corresponds to the relay server 832, has been created. Note that, in FIG. 18, the relay server X connection unit 153 that corresponds to GROUP 2 is not illustrated.

In the case where the routing session is not established between the relay servers 12 and 832, it is determined in Step S1206 that the routing session is not present and, in Step S1209, the communication packet is sent out through the routing session with the relay server 822 as a bypass relay server. This communication packet is then delivered to the client terminal 831 through the routing session between the relay servers 822 and 832.

In the case where a communication error occurs after the communication packet has been sent out in Step S1207 (YES in Step S1208), the communication packet is sent out through the bypass relay server.

A description is now made of an example with reference to the table of FIG. 19. In a similar way to the above-mentioned examples, it is assumed that the relay server 12 receives, from the client terminal 11, the communication packet destined for the client terminal 831. In Step S1205, it is determined that the routing information is present. Then, the routing ID "0003" indicates the routing setting among the relay servers 12, 822 and 832. Accordingly, three routing sessions may be sometimes established, i.e. between the relay servers 12 and 822, between the relay servers 12 and 832, and between the relay servers 822 and 832. In this case, first in Step S1207, the relay server 12 attempts to use the routing session between the relay servers 12 and 832 to transmit the communication packet. In the case where a communication error occurs, the routing session between the relay servers 12 and 822 is used instead, in Step S1209. The communication packet is then finally transferred to the client terminal 831 through the routing session between the relay servers 822 and 832. Note that an error process is performed in the case where the bypass relay server is not present.

In Step S1205, in the case where the information indicating that routing is allowed/possible is not included in the relay group information, the client terminal as the transmission source is notified that it is impossible for the communication packet to reach the destination (Step S1210).

With reference to the block diagram of FIG. 18, the flow of the routing process in the relay server 12 is now described. Basically, the process here is similar to that described with reference to FIG. 2 in the above-mentioned preferred embodiment. The process here is different from that in the above-mentioned preferred embodiment in that, since the relay server 12 has established the routing sessions with two relay servers 23 and 812, the relay server 23 connection unit 153-1 and the relay server 812 connection unit 153-2 have been created.

In a similar way to the above-described preferred embodiment, the communication packet received from the LAN side is processed sequentially by the interface unit 121, the LAN driver 151, the LAN-side IP packet processing unit 152, the routing control unit 154 and the relay server connection processing unit 155. In response to the destination IP address of the communication packet, the relay server connection processing unit 155 outputs the communication packet to either the relay server 23 connection unit 153-1 or the relay server 812 connection unit 153-2. A flow of the subsequent process is similar to that described with reference to FIG. 2 in the above-mentioned preferred embodiment.

As described above, the relay communication system of this preferred embodiment can set a plurality of relay groups in each of the relay servers, and can set individual routing pattern in each of the relay groups. In such a way, in the plurality of LANs which form the relay group, the routing control can be performed in a variety of patterns. Also, based on the update of the relay group information, it is possible to dynamically change the relay groups and the routing groups.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A first relay server connected to a communication terminal via a first LAN and connected to a second relay server via a wide area network, the second relay server being connected to a second LAN, the first relay server comprising:
   a setting unit configured to activate or deactivate a routing function;
   a relay group information sharing unit configured to share, with the second relay server, a relay group information including information used to specify the first relay server and the second relay server constituting the relay group;
   a network address information registration unit configured to register a network address information;
   a routing session establishment unit configured to, upon receiving an instruction to route a communication packet between the first relay server and the second relay server after the routing function is activated by the setting unit, transmit a network address information of the first LAN that routes a communication packet via the first relay server to the second relay server, receive a network address information of the second LAN that routes a communication packet via the second relay server from the second relay server, register the network address information of the first LAN and the network address information of the second LAN in the network address information registration unit, and establish a routing session with the second relay server to route the communication packet between the first LAN and the second LAN;

a routing processing unit configured to, upon receiving a communication packet destined for an IP address belonging to the second LAN as a destination address from the communication terminal, determine whether or not a network address information corresponding to the destination address of the communication packet has been registered in the network address information registration unit, specify the second relay server as a relay server capable of routing the communication packet to a network address corresponding to the destination address, and transfer the communication packet through the routing session with the second relay server; and a routing session disconnection unit configured to receive an instruction to deactivate the routing function from the setting unit, disconnect the routing session, and delete the network address information from the network address information registration unit.

2. The first relay server according to claim 1, further comprising a relay server information sharing unit configured to share a relay server information to register IP addresses of the first relay server and the second relay server.

3. A second relay server connected to a second communication terminal via a second LAN and connected to a first relay server via a wide area network, the first relay server being connected to a first LAN that includes a first client terminal connected thereto, the first client terminal routing a communication packet via the first relay server, and the second LAN including a communication terminal connected thereto, the second relay server comprising:

a setting unit configured to activate or deactivate a routing function;

a relay group information sharing unit configured to share, with the first relay server, a relay group information including information used to specify the first relay server and the second relay server constituting the relay group;

a relay server information sharing unit configured to share, with the first relay server and the first client terminal, a relay server information including information used to specify the first relay server and the second relay server and information used to specify the first client terminal;

a communication unit configured to specify that the first client terminal is connected to the first relay server based on the relay server information and to communicate with the first client terminal through the first relay server;

a network address information registration unit configured to register a network address information;

a routing session establishment unit configured to, upon receiving an instruction to route a communication packet between the first client terminal and the second relay server after the routing function is activated by the setting unit, receive a network address information of the first LAN from the first client terminal through the communication unit, transmit a network address information of the second LAN to the first client terminal through the communication unit, register the network address information of the first LAN and the network address information of the second LAN in the network address information registration unit, and establish a routing session with the first client terminal to route the communication packet between the first LAN and the second LAN;

a routing processing unit configured to, upon receiving a communication packet destined for an IP address belonging to the second LAN as a destination address from the communication terminal, determine whether or not a network address information corresponding to the destination address of the communication packet has been registered in the network address information registration unit, specify the first client terminal as a terminal capable of routing the communication packet to a network address corresponding to the destination address, and transfer the communication packet through the routing session with the first client terminal; and a routing session disconnection unit configured to receive an instruction to deactivate the routing function from the setting unit, disconnect the routing session, and delete the network address information from the network address information registration unit.

4. The second relay server according to claim 3, wherein IP addresses of the first relay server and the second relay server and an IP address of the first client terminal connected to the first relay server are registered in the relay server information.

5. A first relay server connected to a first communication terminal via a first LAN and connected to a second relay server via a wide area network, the second relay server being connected to a second LAN, the first relay server comprising:

a setting unit configured to activate or deactivate a routing function;

a relay group information sharing unit configured to share, with the second relay server, a relay group information including information used to specify the first relay server and the second relay server constituting the relay group;

a network address information registration unit configured to register a network address information;

a routing session establishment unit configured to, upon receiving an instruction to route a communication packet between the first relay server and the second relay server after the routing function is activated, transmit to the second relay server a network address information of the first LAN that routes the communication packet via the first relay server, receive from the second relay server a network address information of the second LAN that routes the communication packet via the second relay server, register the network address information of the first LAN and the network address information of the second LAN in the network address information registration unit along with identification information of routing patterns, and establish a routing session with the second relay server to route the communication packet between the first LAN and the second LAN in a case where the first relay server and the second relay server are involved in one common routing pattern, having identical identification information;

a routing processing unit configured to, upon receiving a communication packet destined for an IP address belonging to the second LAN as a destination address from the first communication terminal, determine whether or not a network address information corresponding to the destination address of the communication packet has been registered in the network address information registration unit after the network addresses information of the first and second LANs have been associated with each other by the same identification information, specify the second relay server as a relay server capable of routing the communication packet to a network address corresponding to the destination address, and transfer the communication packet through the routing session with the second relay server; and a routing session disconnection unit configured to receive an instruction to deactivate the routing function from the setting unit, disconnect the routing session, and delete the network address information and the identification information from the network address information registration unit.

6. A first relay server connected to a first communication terminal via a first LAN and connected to a second relay server and a third relay server via a wide area network, the second relay server being connected to a second LAN, the third relay server being connected to a third LAN, the first relay server comprising:

a setting unit configured to activate or deactivate a routing function;

a relay group information sharing unit configured to share, with the second relay server and the third relay server, a relay group information including information used to specify the first relay server, the second relay server, and the third relay server constituting the relay group;

a network address information registration unit configured to register a network address information;

a routing session establishment unit configured to, upon receiving an instruction to route a communication packet among the first relay server, the second relay server and the third relay server after the routing function is activated by the setting unit, transmit a network address information of the first LAN that routes a communication packet via the first relay server to the second relay server and the third relay server, receive a network address information of the second LAN from the second relay server, receive a network address information of the third LAN from the third relay server, register the network address information of the first LAN, the network address information of the second LAN and the network address information of the third LAN in the network address information registration unit along with identification information of routing patterns, and establish a routing session in an arbitrary combination among the first relay server, the second relay server and the third relay server so that the communication packet may be routed among the first LAN, the second LAN and the third LAN in a case where the first relay server, the second relay server and the third relay server are involved in one common routing pattern, having identical identification information;

a routing processing unit configured to, upon receiving a communication packet destined for an IP address belonging to the second LAN as a destination address from the first communication terminal, determine whether or not a network address information corresponding to the destination address of the communication packet has been registered in the network address information registration unit after the network addresses information of the first and second LANs have been associated with each other by the same identification information, specify the second relay server as a relay server capable of routing the communication packet to a network address corresponding to the destination address, and, if a routing session with the second relay server has been established, transfer the communication packet through the routing session with the second relay server, and if the routing session with the second relay server has not been established, transfer the communication packet through a routing session with the third relay server associated by the same identification information; and a routing session disconnection unit configured to receive an instruction from the setting unit to deactivate the routing function with the second relay server, disconnect the routing session, and delete the network address information and the identification information from the network address registration unit.

7. The first relay server according to claim 6, wherein, in a case where it is determined that it is possible to route the communication packet to the second LAN and where the routing session has been established with the second relay server, when an error occurs in communication through the routing session with the second relay server, the communication packet is transferred through the routing session with the third relay server associated by the same identification information.

8. A first relay server connected to a first communication terminal via a first LAN and connected to a second relay server and a third relay server via a wide area network, the second relay server being connected to a second LAN, the third relay server being connected to a third LAN, the first relay server comprising:

a setting unit configured to activate or deactivate a routing function;

a relay group information sharing unit configured to share, with the second relay server and the third relay server, a relay group information including information used to specify the first relay server, the second relay server, and the third relay server constituting the relay group;

a network address information registration unit configured to register a network address information;

a routing session establishment unit configured to, upon receiving an instruction to route a communication packet among the first relay server, the second relay server and the third relay server after the routing function is activated by the setting unit, transmit a network address information of the first LAN that routes a communication packet via the first relay server to the second relay server and the third relay server, receive a network address information of the second LAN from the second relay server, receive a network address information of the third LAN from the third relay server, register the network address information of the first LAN, the network address information of the second LAN and the network address information of the third LAN in the network address information registration unit along with identification information of routing patterns, and establish a routing session in an arbitrary combination among the first relay server, the second relay server and the third relay server so that the communication packet may be routed between the LANs of the relay servers which are involved in a routing pattern having, among a plurality of the identification information indicating routing patterns, one common identification information;

a routing processing unit configured to, upon receiving a communication packet destined for an IP address belonging to the second LAN as a destination address from the first communication terminal, determine whether or not a network address information corresponding to the destination address of the communication packet has been registered in the network address information registration unit after the network addresses information of the first and second LANs have been associated with each other by the same identification information among the plurality of identification information, specify the second relay server as a relay server capable of routing the communication packet to a network address corresponding to the destination address, and transfer the communication packet through the routing session with the second relay server; and a routing session disconnection unit configured to receive an instruction from the setting unit to deactivate the routing function with the second relay server, disconnect the routing session, and delete the network address information and the identification information from the network address information registration unit.

* * * * *